(12) United States Patent
Kimura et al.

(10) Patent No.: US 11,428,948 B2
(45) Date of Patent: Aug. 30, 2022

(54) BLUR COMPENSATION SYSTEM

(71) Applicants: NTT DOCOMO, INC., Chiyoda-ku (JP); TOKYO INSTITUTE OF TECHNOLOGY, Meguro-ku (JP)

(72) Inventors: Shinji Kimura, Chiyoda-ku (JP); Kazuhiko Takahashi, Chiyoda-ku (JP); Yuji Aburakawa, Chiyoda-ku (JP); Masahiro Yamaguchi, Meguro-ku (JP); Tomoya Nakamura, Meguro-ku (JP); Shunsuke Igarashi, Meguro-ku (JP)

(73) Assignees: NTT DOCOMO, INC., Chiyoda-ku (JP); TOKYO INSTITUTE OF TECHNOLOGY, Meguro-ku (JP)

( * ) Notice: Subject to any disclaimer, the term of this patent is extended or adjusted under 35 U.S.C. 154(b) by 527 days.

(21) Appl. No.: 16/464,337

(22) PCT Filed: Dec. 26, 2017

(86) PCT No.: PCT/JP2017/046741
§ 371 (c)(1),
(2) Date: May 28, 2019

(87) PCT Pub. No.: WO2018/146970
PCT Pub. Date: Aug. 16, 2018

(65) Prior Publication Data
US 2021/0109366 A1 Apr. 15, 2021

(30) Foreign Application Priority Data
Feb. 9, 2017 (JP) .............................. JP2017-022271

(51) Int. Cl.
*G02B 27/64* (2006.01)
*G02B 5/08* (2006.01)
(Continued)

(52) U.S. Cl.
CPC ......... *G02B 27/646* (2013.01); *G02B 5/0808* (2013.01); *G02B 27/18* (2013.01); *G03B 21/142* (2013.01); *G03B 2205/0038* (2013.01)

(58) Field of Classification Search
CPC .... G02B 27/646; G02B 27/18; G02B 5/0808; G03B 21/142; G03B 2205/0038
(Continued)

(56) References Cited

U.S. PATENT DOCUMENTS 5,210,626 A    5/1993  Kumayama et al.
6,332,689 B1  12/2001  Shirasaki et al.
(Continued)

FOREIGN PATENT DOCUMENTS

JP        3-11341 3 A    5/1991

OTHER PUBLICATIONS

International Preliminary Report on Patentability and Written Opinion dated Aug. 22, 2019 in PCT/JP2017/046741 (English Translation only), 7 pages.
(Continued)

*Primary Examiner* — Marin Pichler
*Assistant Examiner* — Mitchell T Oestreich
(74) *Attorney, Agent, or Firm* — Oblon, McClelland, Maier & Neustadt, L.L.P.

(57) ABSTRACT

A blur compensation system includes: a mirror on which light of an image from a predetermined position is incident and which reflects light of a specific wavelength such that an incidence angle and an emission angle of the light of the specific wavelength are different from each other; a mirror that is disposed at a position on which the light of an image which is reflected by the mirror is incident and reflects the light of the specific wavelength such that an incidence angle and an emission angle of the light of the specific wavelength are different from each other; and a lens that is disposed on
(Continued)

an optical axis of the light of an image between the mirror and the mirror and changes a direction of the light of an image which is reflected by the mirror such that light of a wavelength other than the specific wavelength out of the light of an image which is reflected by the mirror is emitted in the same direction as the light of the specific wavelength from an emission position of the light of the specific wavelength in the mirror.

10 Claims, 11 Drawing Sheets

(51) Int. Cl.
    *G02B 27/18*     (2006.01)
    *G03B 21/14*     (2006.01)
(58) Field of Classification Search
    USPC ............................................. 359/233
    See application file for complete search history.

(56) References Cited

U.S. PATENT DOCUMENTS

| | | |
|---|---|---|
| 9,341,850 B1 | 5/2016 | Cakmakci et al. |
| 2002/0044364 A1 | 4/2002 | Shirasaki et al. |
| 2003/0081318 A1 | 5/2003 | Shirasaki et al. |
| 2003/0153835 A1* | 8/2003 | Watanabe ............ G02B 27/18 |
| | | 600/476 |
| 2004/0066547 A1 | 4/2004 | Parker et al. |
| 2004/0165270 A1 | 8/2004 | Shirasaki et al. |
| 2005/0174653 A1 | 8/2005 | Shirasaki et al. |
| 2006/0227426 A1 | 10/2006 | Shirasaki et al. |
| 2010/0149619 A1 | 6/2010 | Olaya |
| 2012/0147908 A1 | 6/2012 | Simanovski et al. |
| 2014/0204964 A1 | 7/2014 | Simanovski et al. |
| 2017/0269364 A1* | 9/2017 | Fujita .................. B60K 37/04 |

OTHER PUBLICATIONS

European Office Action dated May 4, 2021 in European Patent Application No. 17896243.7, 6 pages.
International Search Report dated Apr. 3, 2018 in PCT/JP2017/046741 filed Dec. 26, 2017.
Murase, K. et al., "Immersive Augmented Reality Environment Using Large Semi-transparent Mirror and the Representation of Correct Occlusion Effect," The Journal of Japanese Society of Virtual Reality, vol. 13, No. 2, Jun. 2008, 16 pages (with partial English translation).
Extended European Search Report dated Sep. 11, 2019 in European Patent Application No. 17896243.7, 10 pages.
Office Action dated Aug. 28, 2020 in corresponding European Patent Application No. 17 896 243.7, 4 pages.
Japanese Office Action dated Aug. 27, 2019 in Japanese Patent Application No. 2017-022271 (with English translation), 9 pages.

* cited by examiner (a)

(b)

BLUR COMPENSATION SYSTEM

TECHNICAL FIELD

The present invention relates to a blur compensation system.

BACKGROUND ART

Non-Patent Literature 1 discloses an image presentation system using a half mirror. In this system, a floor screen and a half mirror are arranged in front of a user. The floor screen is arranged horizontally on the floor. The half mirror is arranged in front of a user above the floor screen. On the rear side of the half mirror, an illumination can be set to be darker in comparison with a place in which the user is located. The half mirror is arranged to be inclined by 45 degrees with respect to the floor screen such that a distance from the floor screen increases toward the user.

In this configuration, when a projector projects light of an image onto the floor screen, the light of an image projected onto the floor screen is incident on the half mirror, is reflected at a reflection angle of the same magnitude as an incidence angle, and is then presented to the user. Since the half mirror is inclined by 45 degrees as described, the image appears to rise in a front space which is located opposite to the user with the half mirror interposed therebetween from the user's point of view. In this way, an image which appears to be in front of the user can be presented to the user.

CITATION LIST

Non Patent Literature

Non-Patent Literature 1: Kaori Murase, Tetsuro Ogi, Kouta Saito, Takahide Koyama, "Immersive Augmented Reality Environment Using Large Semi-transparent Mirror and the Representation of Correct Occlusion Effect," [online], the Journal of Japanese Society of Virtual Reality, Vol. 13, No. 2, pp. 141-150, 2008.6, [accessed on Jan. 23, 2017], Internet <URL: http://lab.sdm.keio.ac.jp/ogi/papers/TVRSJ2008-murase.pdf>

SUMMARY OF INVENTION

Technical Problem

The half mirror which is used in the system disclosed in Non-Patent Literature 1 has regular reflection characteristics in which an incidence angle and a reflection angle are the same and thus an arrangement angle thereof is limited. When the arrangement angle of the half mirror is limited, for example, a degree of freedom in system design decreases. It is thought that this problem can be solved by using a reflective optical element in which an incidence angle and a reflection angle are different from each other or a transmissive optical element in which an incidence angle and an emission angle are different from each other. "Emission" and "emission angle" in this specification include "reflection" and "reflection angle" in a reflective optical element.

Examples of an optical element in which an incidence angle and an emission angle are different from each other include a diffractive optical element (DOE) and a holographic optical element (HOE). In such optical elements, an incidence angle and an emission angle can become different from each other when an optical path changes due to diffraction. When an optical element such as a DOE or an HOE is designed such that an incidence angle and an emission angle are different from each other when light of a specific wavelength is incident thereon, light of a peripheral wavelength of the specific wavelength is emitted at an emission angle which deviates from the emission angle of the light of the specific wavelength. When this optical element is used instead of the half mirror, blur is generated in an image which is presented to a user because of a change of an optical path due to diffraction.

The present invention is made in consideration of the above-mentioned circumstances and an objective thereof is to provide a blur compensation system that can curb blur which is generated when an optical element in which an incidence angle and an emission angle are different from each other is used.

Solution to Problem

According to an aspect of the invention, there is provided a blur compensation system including: a first optical element on which light of an image from a predetermined position is incident and which reflects or transmits light of a specific wavelength such that an incidence angle and an emission angle of the light of the specific wavelength are different from each other; a second optical element that is disposed at a position on which the light of an image which is reflected or transmitted by the first optical element is incident and reflects or transmits the light of the specific wavelength such that an incidence angle and an emission angle of the light of the specific wavelength are different from each other; and a third optical element that is disposed on an optical axis of the light of an image between the first optical element and the second optical element and changes a direction of the light of an image which is reflected or transmitted by the first optical element such that light of a wavelength other than the specific wavelength out of the light of an image which is reflected or transmitted by the first optical element is emitted in the same direction as the light of the specific wavelength from an emission position of the light of the specific wavelength in the second optical element.

In this blur compensation system, the first optical element reflects or transmits light of a specific wavelength such that the incidence angle and the emission angle are different from each other. The first optical element which is designed in this way emits light of a peripheral wavelength of the specific wavelength at an emission angle which deviates from the emission angle of the light of the specific wavelength. Accordingly, blur is generated in the light of an image reflected by the first optical element or the light of an image transmitted by the first optical element. Here, in the blur compensation system, the third optical element changes the direction of the light of an image which is reflected or transmitted by the first optical element such that light of a wavelength other than the specific wavelength among the light of an image reflected or transmitted by the first optical element is emitted in the same direction as the light of the specific wavelength from an emission position of the light of the specific wavelength in the second optical element. That is, the blur which is generated due to the first optical element is compensated for by the second optical element and the third optical element. In the same principle, blur which is generated due to the second optical element is compensated for by the first optical element and the third optical element. Accordingly, it is possible to curb blur which is generated when an optical element in which an incidence angle and an emission angle are different from each other is used.

Advantageous Effects of Invention

According to the aspect of the invention, it is possible to curb blur which is generated when an optical element in which an incidence angle and an emission angle are different from each other is used.

DESCRIPTION OF EMBODIMENTS

Figure 1:
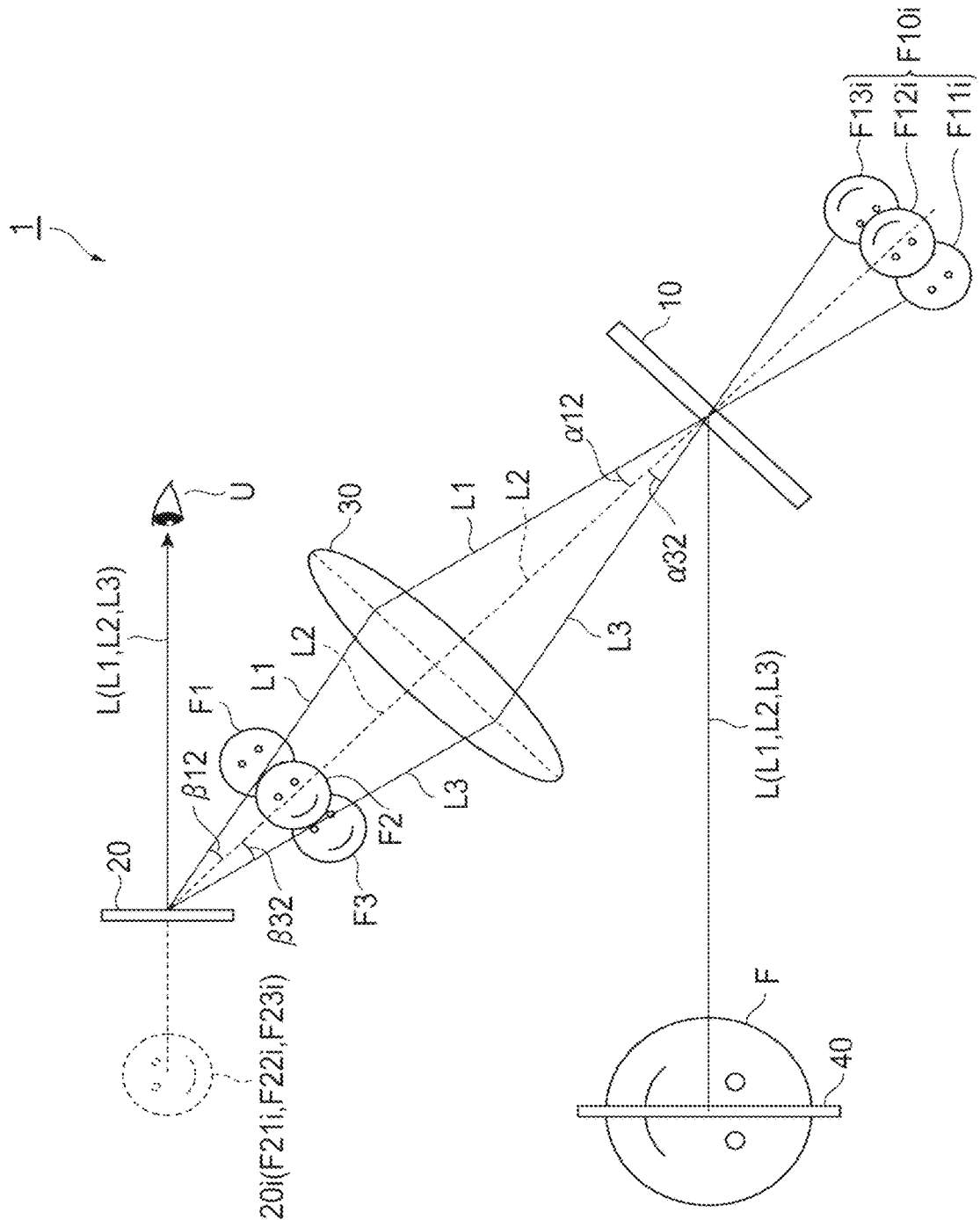
FIG. 1 is a diagram schematically illustrating a configuration of a blur compensation system.

A basic configuration of a blur compensation system according to an embodiment will be first described and an example of a detailed configuration thereof will then be described with reference to the accompanying drawings. The blur compensation system according to the embodiment includes first to third optical elements. The first and second optical elements are reflective optical elements or transmission optical elements that reflect or transmit light of a specific wavelength such that an incidence angle and an emission angle of light of the specific wavelength are different from each other.

Specifically, the first optical element and the second optical elements are optical elements which are called DOEs, HOEs, or the like and are designed such that an incidence angle and an emission angle of light of a specific wavelength are different from each other. For example, when the optical elements are HOEs, both a reflective HOE and a transmission HOE are designed to transmit, absorb, or the like light of wavelengths other than a specific wavelength. Regarding this effect (such as lens/mirror effects), when an optical element is a DOE, an optical element in which an incidence angle and an emission angle are different from each other is obtained by selecting a lattice constant or the like. When an optical element is an HOE, an optical element in which an incidence angle and emission angle are different from each other is obtained by selecting an exposure condition, an exposure wavelength, and the like. Wavelength selectivity of an optical element has a certain range. The range of wavelength selectivity is about ±10 nm from a specific wavelength (a center wavelength), for example, in the case of an HOE. Light of a wavelength around (a peripheral wavelength of) the specific wavelength is affected by the lens/mirror effects and the like. Specifically, the optical elements emit light of a wavelength (a peripheral wavelength) in the vicinity of the specific wavelength at an angle which deviates from the emission angle of light of the specific wavelength. An influence of lens/mirror effects or the like on light of a peripheral wavelength is exhibited as a diffraction effect at an angle in the vicinity of a diffraction angle of light of the specific wavelength. It can also be said that diffraction blur is generated due to wavelength dispersion of an optical element such as a DOE or an HOE.

The first optical element and the second optical element may have substantially the same optical characteristics. Substantially the same optical characteristics means that a relationship between an incidence angle and an emission angle of light of a specific wavelength in the first optical element is substantially the same as a relationship between an incidence angle and an emission angle of light of a specific wavelength in the second optical element. The relationship between an incidence angle and an emission angle may be expressed, for example, using a ratio between the incidence angle and the emission angle. The third optical element is an optical element that is disposed between the first optical element and the second optical element and changes an optical path of light progressing from the first optical element to the second optical element and/or an optical path of light progressing from the second optical element to the first optical element.

An embodiment of the present invention will be described with reference to the accompanying drawings. In description with reference to the drawings, the same elements will be referred to by the same reference signs and description thereof will not be repeated.

FIG. 1 is a diagram illustrating an example of a configuration of a blur compensation system according to an embodiment. The blur compensation system 1 is used to compensate for blur which is generated in an image, for example, when the image is presented to a user via an optical element such as a DOE or an HOE. For example, in order to present an image which appears to be present in front of the user as disclosed in Non-Patent Literature 1 to the user, the image is not presented directly to the user but is presented to the user via an optical element.

The blur compensation system 1 includes a mirror 10, a mirror 20, and a lens 30. That is, in FIG. 1, the mirror 10, the mirror 20, and the lens 30 are exemplified as the first to third optical elements which are included in the blur compensation system 1. In this example, an image which is reflected by the mirror 20 is presented to a user U, and the mirror 20 is arranged vertically to face the user U. The blur compensation system 1 may further include a display 40 that is disposed at a predetermined position as an element that outputs light of an image which is presented to the user U. In this example, the display 40 is arranged vertically below the mirror 20 and displays an image.

The mirror 10 is designed such that an incidence angle and a reflection angle of light of a specific wavelength are different from each other. Accordingly, the mirror 10 reflects light of a specific wavelength such that an incidence angle and a reflection angle thereof are different from each other. The specific wavelength is set to include wavelengths of light constituting an image which is displayed by the display 40. Light of the specific wavelength may be light of one wavelength (monochromatic light) or may be light of a plurality of wavelengths (polychromatic light). The mirror 10 which is the first optical element is an optical element such as a DOE or an HOE as described above and thus reflects light of a peripheral wavelength at a reflection angle which deviates from the reflection angle of the light of the specific wavelength. The deviation of the reflection angle of the light of a peripheral wavelength from the reflection angle of the light of the specific wavelength increases as the wavelength is farther from the specific wavelength.

For example, in $-1^{st}$-order reflected light out of light which is reflected by the mirror 10, an angle (an optical path change angle) formed by an incident optical path and a reflected optical path is less than an optical path change angle of light which is regularly reflected ($0^{th}$-order reflected light). As the wavelength becomes less than the specific wavelength, the optical path change angle of the light of the wavelength becomes larger. As the wavelength becomes greater than the specific wavelength, the optical path change angle of the light of the wavelength becomes smaller. In $+1^{st}$-order reflected light out of the light which is reflected by the mirror 10, the optical path change angle is larger than the optical path change angle of the $0^{th}$-order reflected light. As the wavelength becomes less than the specific wavelength, the optical path change angle of the light of the wavelength becomes smaller. As the wavelength becomes greater than the specific wavelength, the optical path change angle of the light of the wavelength becomes larger. In the example illustrated in FIG. 1, it is assumed that $-1^{st}$-order reflected light is used as light which is reflected by the mirror 10 and the mirror 20.

In the blur compensation system 1, the mirror 10 has light of an image F which is displayed by the display 40 incident thereon and is positioned such that the light of the image F is reflected to the mirror 20. In the example illustrated in FIG. 1, the mirror 10 is arranged to be inclined by 45 degrees with respect to the mirror 20 and the display 40 which are arranged vertically in the upward-downward direction. The direction of the image F which is displayed by the display 40 is adjusted to be an appropriate direction when the image F reflected by the mirror 10 and the mirror 20 is observed by the user U. Examples of the display 40 include a liquid crystal display and a diffusing screen onto which an image is projected from a projector.

In this embodiment, the mirror 20 is designed to have substantially the same optical characteristics as the mirror 10. In this case, similarly to the mirror 10, the mirror 20 reflects light of a specific wavelength such that an incidence angle and a reflection angle thereof are different from each other. Similarly to the mirror 10, the mirror 20 reflects light of a peripheral wavelength at a reflection angle which deviates from the reflection angle of the light of the specific wavelength.

The lens 30 is arranged on an optical axis of the light of an image F between the mirror 10 and the mirror 20 and changes a direction of the light of the image F which is reflected by the mirror 10. The lens 30 is positioned such that an optical axis direction of the lens 30 and an optical axis direction of the light of the image F between the mirror 10 and the mirror 20 match each other. In the example illustrated in FIG. 1, the lens 30 is a condensing lens such as a convex lens and is arranged to face the mirror 10. Change of the direction of the light of the image by the lens 30 will be specifically described below.

In FIG. 1, an optical path of light of an image F is illustrated as an optical path L. Actually, an image F which is displayed by the display 40 includes a lot of light spots and light diffuses and progresses in a plurality of directions from the light spots. For the purpose of easy understanding, an optical path of light progressing in one direction of a plurality of directions toward the mirror 10 from one light spot of the image F in the display 40 will be described below. The same description is true of other light spots and optical paths of light progressing in other directions.

The optical path of light of an image F from the display 40 to the mirror 10 is illustrated as an optical path L. As described above, since the mirror 10 reflects the light of a specific wavelength and also reflects light of a peripheral wavelength at a reflection angle deviating from the reflection angle of the light of the specific wavelength, the optical paths of the specific wavelength and the peripheral wavelength reflected by the mirror 10 are different from each other. In FIG. 1, the optical path of the light of the specific wavelength is illustrated as an optical path L2. An optical path of light of a wavelength shorter than the specific wavelength (a wavelength on a short wavelength side) out of the peripheral wavelengths is illustrated as an optical path L1. An optical path of light of a wavelength longer than the specific wavelength (a wavelength on a long wavelength side) out of the peripheral wavelengths is illustrated as an optical path L3. A difference between the reflection angle of the light of the specific wavelength and the reflection angle of light of a wavelength on the short wavelength side at an incidence position of the light of the specific wavelength on the mirror 10 is illustrated as an angle $\alpha 12$. A difference between the reflection angle of the light of the specific wavelength and the reflection angle of light of a wavelength on the long wavelength side is illustrated as an angle $\alpha 32$.

Since the optical paths L1 to L3 of the light of an image F which are reflected by the mirror 10 are different from each other, blur is generated in a virtual image F10$i$ of the image F which is formed by the mirror 10. Specifically, as illustrated in FIG. 1, in the virtual image F10$i$ formed by the mirror 10, a position of a virtual image F12$i$ based on the light of the specific wavelength, a position of a virtual image F11$i$ based on the light of a wavelength on a short wavelength side, and a position of a virtual image F13$i$ based on the light of a wavelength on a long wavelength side deviate from each other. The virtual image F12$i$ is formed by focusing the light of the specific wavelength. The virtual image F11$i$ is formed by focusing the light of the wavelength on a short wavelength side. The virtual image F13$i$ is formed by focusing the light of the wavelength on a long wavelength side. As described above, since the peripheral wavelength is about ±10 nm from the specific wavelength when the optical elements are HOEs, the virtual images F11$i$, F12$i$, and F13$i$ are not clearly separately recognized and are visually recognized as blur of a virtual image when the user U sees it.

The light of peripheral wavelengths (a wavelength on the short wavelength side and a wavelength on the long wavelength side) which is reflected by the mirror 10 is changed in directions thereof (that is, the optical path L1 and the optical path L3) by the lens 30 and is then incident on the same position as the mirror 20. A difference between an incidence angle of the light of the specific wavelength and an incidence angle of the light of a wavelength on the short wavelength side at an incidence position of the light of the specific wavelength on the mirror 20 is illustrated as an angle $\beta 12$. A difference between the incidence angle of the light of the specific wavelength and the incidence angle of the light of a wavelength on the long wavelength side is illustrated as an angle β32.

In this embodiment, the lens 30 changes the direction of the light of the image F which is reflected by the mirror 10 such that light of a peripheral wavelength out of the light of the image F reflected by the mirror 10 is emitted in the same direction as the light of the specific wavelength from an emission position of the light of the specific wavelength on the mirror 20.

When the mirror 10 and the mirror 20 are designed to have substantially the same optical characteristics, the lens 30 changes the directions (that is, the optical path L1 and the optical path L3) of light of the image F which are reflected by the mirror 10 such that the angle β12 and the angle β32 match the angle α12 and the angle α32, respectively. The matching herein means that the magnitude of the angle β12 and the magnitude of the angle α12 are the same and that the magnitude of the angle β32 and the magnitude of the angle α32 are the same.

When the incidence angle of light of a wavelength on the short wavelength side on the mirror 20 is the same as the incidence angle of the light of the specific wavelength on the mirror 20, the direction of the light of a wavelength on the short wavelength side which is reflected by the mirror 20 deviates by the angle α 12 from the direction of the light of the specific wavelength. When light of a wavelength on the short wavelength side is incident on the mirror 20 at an angle which is different by the angle β12 with the same magnitude as the angle α12 from the incidence angle of the light of the specific wavelength, the deviation (wavelength dispersion of the mirror 20) cancelled and thus the direction (that is, the optical path L1) of the light of a wavelength on the short wavelength side which is reflected by the mirror 20 matches the direction (that is, the optical path L2) of the light of the specific wavelength.

When the incidence angle of light of a wavelength on the long wavelength side on the mirror 20 is the same as the incidence angle of the light of the specific wavelength on the mirror 20, the direction of the light of a wavelength on the long wavelength side which is reflected by the mirror 20 deviates by the angle α32 from the direction of the light of the specific wavelength. When light of a wavelength on the long wavelength side is incident on the mirror 20 at an angle which is different by the angle β32 with the same magnitude as the angle α32 from the incidence angle of the light of the specific wavelength, the deviation (wavelength dispersion of the mirror 20) is cancelled and thus the direction (that is, the optical path L3) of the light of a wavelength on the long wavelength side which is reflected by the mirror 20 matches the direction (that is, the optical path L2) of the light of the specific wavelength.

Accordingly, in the virtual image F20i of the image F which is formed (focused) by the mirror 20, a position of a virtual image F22i based on the light of the specific wavelength, a position of a virtual image F21i based on light of a wavelength on the short wavelength side, a position of a virtual image F23i based on light of a wavelength on the long wavelength side are aligned. The virtual image F22i is formed by focusing the light of the specific wavelength. The virtual image F21i is formed by focusing the light of the wavelength on the short wavelength side. The virtual image F23i is formed by focusing the light of the wavelength on the long wavelength side. As a result, blur which is generated when the mirror 10 is used is compensated for. In other words, the dispersion of the mirror 10 and the mirror 20 is compensated for.

When the light of the image F is reflected by the mirror 20, the image F is presented to a user U who observes the mirror 20 from the front of the mirror 20. For example, when the mirror 20 is configured to transmit light of a wavelength other than the specific wavelength, the user U can recognize a front space which is located on the side opposite to the user U with respect to the mirror 20. In this case, an image in which the image F based on the light of the specific wavelength and the peripheral wavelengths thereof appears to rise in the front space is presented to the user U. The blur compensation system 1 can be used as an image presentation system that presents an image in which the image F appears to be present in front of the user U to the user U. In the image which is presented to the user U, blur of the image is compensated for.

Different optical elements such as DOEs or HOEs may be used as the mirror 10 and the mirror 20 depending on the magnification of the lens 30, a virtual image distance which is presented to the user U (a distance indicating a depth of a virtual image F20 with respect to the emission surface of the mirror 20), and the like. In this case, since the mirror 10 and the mirror 20 may have different optical characteristics, the angle β12 and the angle β32 may not match the angle α12 and the angle α32, which belongs to the scope of the present application in the configuration for compensating for blur in the image F using the mirror 10, the mirror 20, and the lens 30.

Blur which is generated when an optical element of which an incidence angle and an emission angle are different from each other is used will be quantitatively described below with reference to FIG. 2. In the example illustrated in FIG. 2, an optical element is a reflective optical element which is called HOE. In the following description with reference to FIG. 2, this optical element is simply referred to as an "HOE." The same is true of other optical elements such as DOES.

Figure 2:
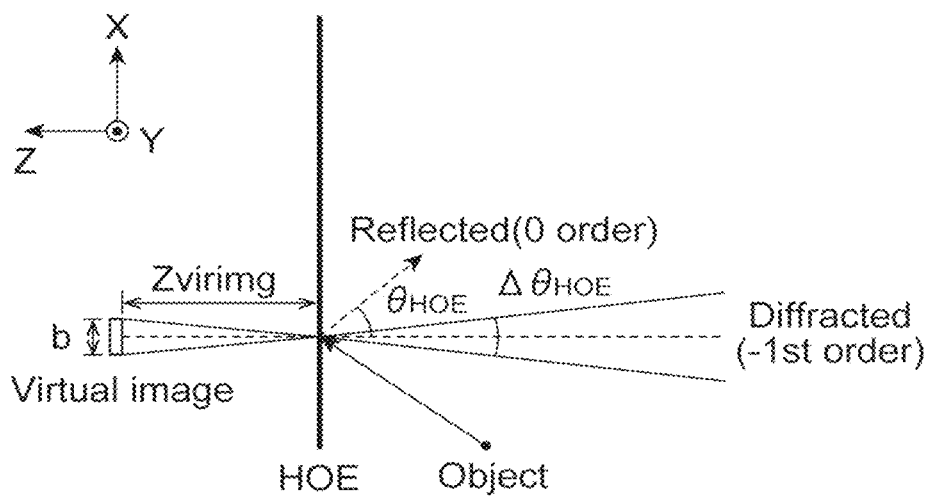
FIG. 2 is a diagram quantitatively illustrating blur.
Figure 2:
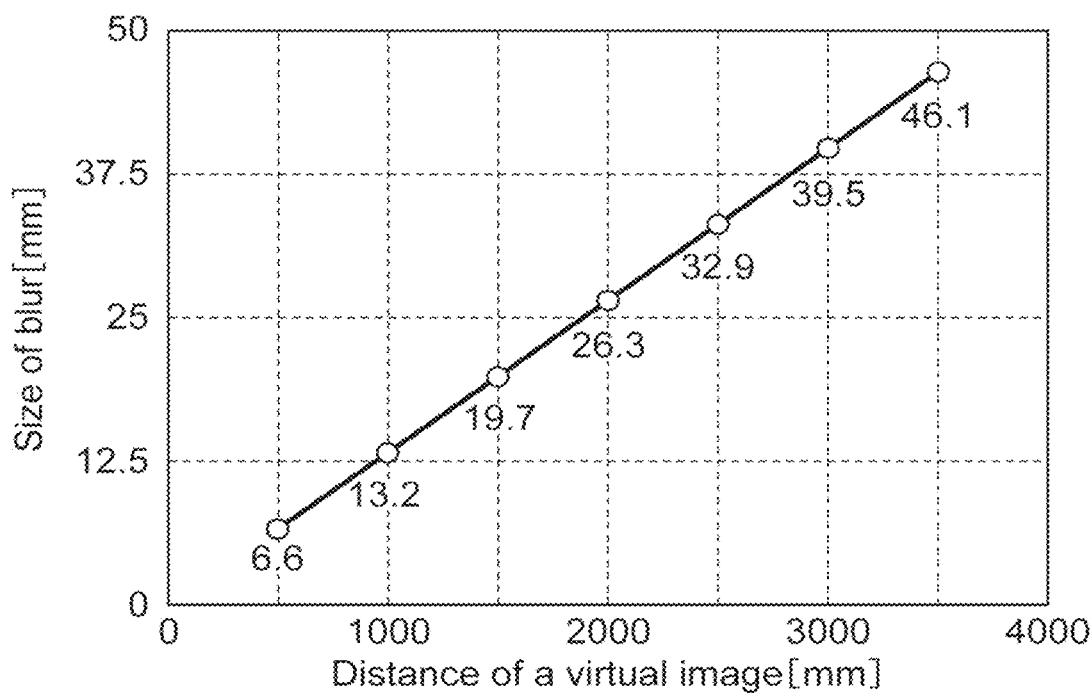

(a) of FIG. 2 conceptually illustrates a relationship between a dispersive wavelength of an HOE and a spatial blur of a virtual image. A state of dispersion of $-1^{st}$-order reflected light (Diffracted (−1st order)) out of light which is reflected by an HOE having a reflecting surface extending in the YX plane is illustrated therein. When light of an image from an object is reflected by the HOE, a reflection angle of light of a specific wavelength and a reflection angle of light of a peripheral wavelength are different from each other and thus light disperses. Accordingly, in an area in which a virtual image is formed by the HOE, virtual images based on light of the wavelengths appear at different positions in the in-plane direction of the HOE. In (a) of FIG. 4, a state in which light of the wavelengths arrives at different positions in the X direction is illustrated. At the position of the virtual image which is formed by the HOE, a distance between light of a wavelength on the longest wavelength side and light of a wavelength on the shortest wavelength side is defined as a blur size b. In this case, the blur size b is expressed by Equation (1).

[Math. 1]

$$b = \left| \frac{z_{virimg} \Delta \lambda_{HOE}}{\lambda_0} \tan\theta_{HOE} \right| \quad (1)$$

In Equation (1), Zvirimg represents a distance (a virtual image distance) indicating a depth of the virtual image with respect to the emission surface of the HOE and corresponds to a distance between the HOE and the object. $\Delta\lambda_{HOE}$ represents the magnitude of a wavelength range of light which is dispersed by the HOE and corresponds to the magnitude of the range of the peripheral wavelength. $\lambda_0$ represents a wavelength of an incident light and corresponds to the specific wavelength. $\theta_{HOE}$ represents an optical path change angle of $-1^{st}$-order light which is caused by change of an optical path due to diffraction of $-1^{st}$-order reflected light by the HOE. In this example, since the $-1^{st}$-order reflected light is reflected in the normal direction of the HOE, $\theta_{HOE}$ corresponds to the incidence angle (or can also be said to correspond to the reflection angle of $0^{th}$-order reflected light).

In (b) of FIG. 2, an example of a relationship between the blur size b and the virtual image distance (Zvirming) is illustrated as a graph. The horizontal axis of the graph represents a virtual image distance (Distance of a virtual image). The vertical axis of the graph represents a blur size b (Size of blur). The blur size b is a value which is calculated when $\lambda_0$=532 nm, $\Delta\lambda_{HOE}$=7 nm (that is, the longest wavelength of the peripheral wavelengths is equal to (532+7/2) nm and the shortest wavelength of the peripheral wavelengths is equal to (532−7/2) nm), and $\theta_{HOE}$=45 degrees are set. As indicated by the graph illustrated in (b) of FIG. 4, as the virtual image distance increases, the blur size b also increases. For example, when the virtual image distance is 1500 mm, the blur size b reaches about 20 mm.

By defining the blur size b in this way, blur which is generated by change of an optical path due to diffraction can be estimated. In the blur compensation system 1 according to this embodiment, since the blur size b decreases, blur which is generated when an optical element of which an incidence angle and an emission angle are different from each other such as a DOE or an HOE is used can be curbed. As can be seen from Equation (1), since the blur size b increases as the virtual image distance increases, the advantage of blur compensation using the blur compensation system 1 according to this embodiment increases as the virtual image distance increases. For example, in the example illustrated in FIG. 1, as the distance between the mirror 10 and the mirror 20 increases (the system size increases), the advantage of blur compensation increases.

Figure 3:
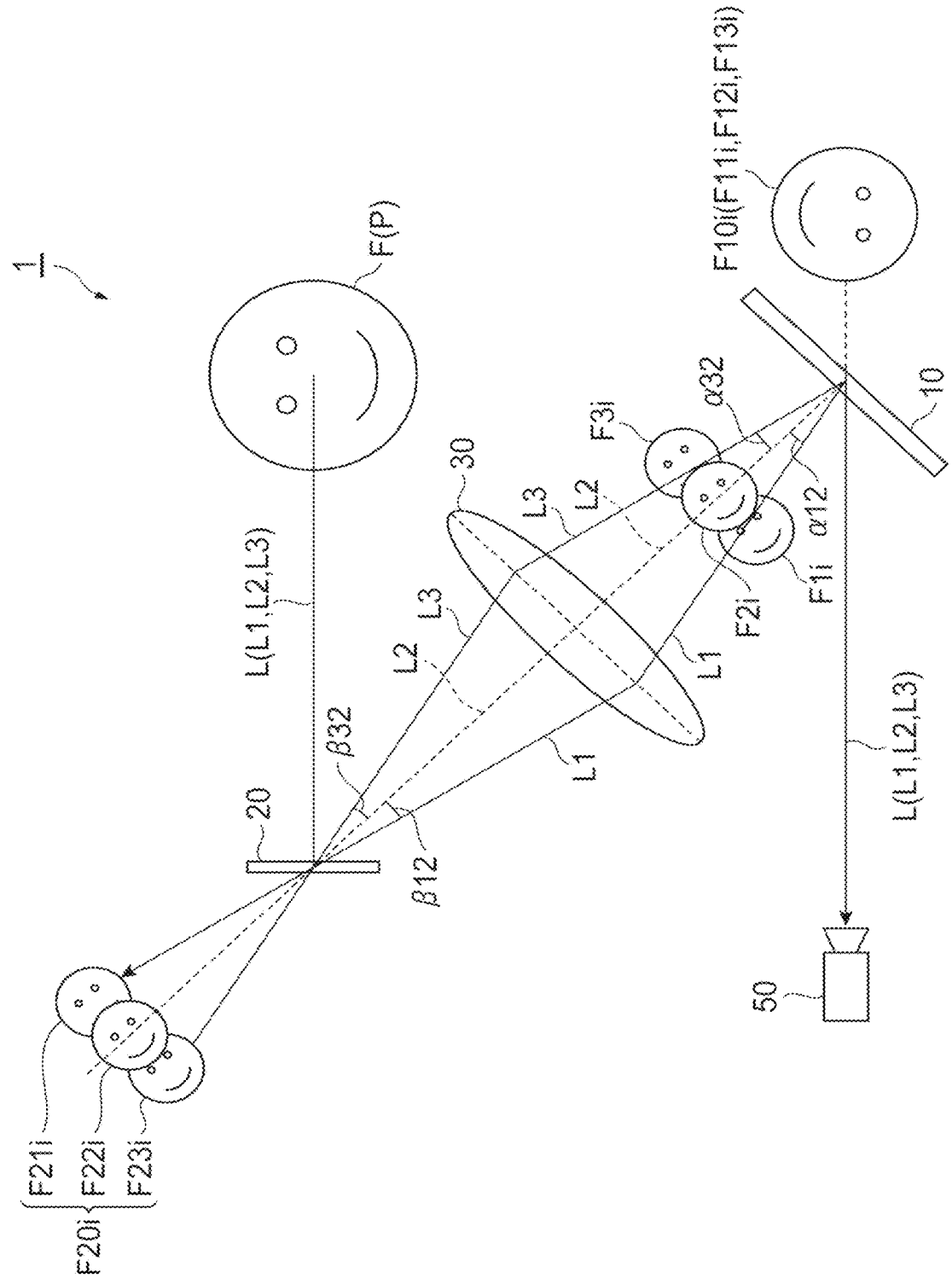
FIG. 3 is a diagram schematically illustrating a configuration of a blur compensation system.

On the other hand, the blur compensation system 1 may be used as an imaging system. In the example illustrated in FIG. 3, the blur compensation system 1 includes a camera 50 instead of the display 40 (FIG. 1). In this example, it is assumed than an object P which is imaged by the camera 50 is located in front of the mirror 20. In FIG. 3, an image of the object P is illustrated as an image F similarly to FIG. 1.

In FIG. 3, an optical path of light of the image F is illustrated as an optical path L. As described above with reference to FIG. 1, an optical path of light progressing in one direction of a plurality of directions from one light spot of the image F toward the mirror 20 will be described below.

An optical path of the light of the image F from the object P to the mirror 20 is illustrated as an optical path L. Since the mirror 20 reflects light of a specific wavelength and also reflects light of peripheral wavelengths at reflection angles deviating from the reflection angle of the light of the specific wavelength, the light of the specific wavelength and the light of the peripheral wavelengths which are reflected by the mirror 20 are different from each other. In FIG. 3, similarly to FIG. 1, the optical path of the light of the specific wavelength is illustrated as an optical path L2. The optical path of light of a wavelength on the short wavelength side is illustrated as an optical path L1. The optical path of light of a wavelength on the long wavelength side is illustrated as an optical path L3, A difference between the reflection angle of the light of the specific wavelength and the reflection angle of the light of a wavelength on the short wavelength side at an incidence position of the light of the specific wavelength on the mirror 20 is illustrated as an angle β12. A difference between the reflection angle of the light of the specific wavelength and the reflection angle of light of a wavelength on the long wavelength side on the mirror 20 is illustrated as an angle β32.

Since the optical paths of light of the image F which are reflected by the mirror 20 are the optical paths L1, L2, and L3 which are different, blur is generated in a virtual image F20*i* of the image F which is formed by the mirror 20. Specifically, as illustrated in FIG. 3, in the virtual image F20*i* formed by the mirror 20, a position of a virtual image F22*i* based on the light of the specific wavelength, a position of a virtual image F21*i* based on light of a wavelength on the short wavelength side, a position of a virtual image F23*i* based on light of a wavelength on the long wavelength side deviate from each other.

Light of peripheral wavelengths (a wavelength on the short wavelength side and a wavelength on the long wavelength side) reflected by the mirror 20 is changed in directions thereof (that is, the optical path L1 and the optical path L3) by the lens 30 and is then incident on the mirror 10. A difference between an incidence angle of the light of the specific wavelength and an incidence angle of the light of a wavelength on the short wavelength side at an incidence position of the light of the specific wavelength on the mirror 10 is illustrated as an angle α12. A difference between the incidence angle of the light of the specific wavelength and an incidence angle of light of a wavelength on the long wavelength side on the mirror 10 is illustrated as an angle α32.

The lens 30 changes the directions (that is, the optical path L1 and the optical path L3) of light of the image F which are reflected by the mirror 20 such that the angle α12 and the angle α32 match the angle β12 and the angle β32, respectively. The matching means that the magnitude of the angle α12 and the magnitude of the angle β12 are the same and that the magnitude of the angle α32 and the magnitude of the angle β32 are the same.

When the incidence angle of light of a wavelength on the short wavelength side on the mirror 10 is the same as the incidence angle of the light of the specific wavelength on the mirror 10, the direction of the light of the wavelength on the short wavelength side reflected by the mirror 10 deviates by the angle β12 from the direction of the light of the specific wavelength. When the light of a wavelength on the short wavelength side is incident on the mirror 10 at an angle deviating by the angle α12 having the same magnitude as the angle β12 from that of the light of the specific wavelength, the deviation (the wavelength dispersion of the mirror 10) is cancelled and thus the direction (that is, the optical path L1) of a wavelength on the short wavelength side reflected by the mirror 10 matches the direction (that is, the optical path L2) of the light of the specific wavelength.

When the incidence angle of light of a wavelength on the long wavelength side on the mirror 10 is the same as the incidence angle of the light of the specific wavelength on the mirror 10, the direction of the light of the wavelength on the long wavelength side reflected by the mirror 10 deviates by the angle β2 from the direction of the light of the specific wavelength. When the light of a wavelength on the long wavelength side is incident on the mirror 20 at an angle deviating by the angle α32 having the same magnitude as the angle β2 from that of the light of the specific wavelength, the deviation (the wavelength dispersion of the mirror 10) is cancelled and thus the direction (that is, the optical path L3) of the light of a wavelength on the long wavelength side reflected by the mirror 20 matches the direction (that is, the optical path L2) of the light of the specific wavelength.

Accordingly, in a virtual image F10$i$ of the image F which is formed (focused) by the mirror 10, a position of a virtual image F12$i$ based on the light of the specific wavelength, a position of a virtual image F11$i$ based on light of a wavelength on the short wavelength side, a position of a virtual image F13$i$ based on light of a wavelength on the long wavelength side are aligned. As a result, blur which is generated when the mirror 20 is used is compensated for. In other words, the dispersion of the mirror 10 and the mirror 20 is compensated for.

When the light of the image F is reflected by the mirror 10, the image F of the object P can be captured, for example, using the camera 50 which is located in the reflection direction of the image F when seen from the mirror 10. That is, the blur compensation system 1 can be used as an imaging system that images an object P using the camera 50. In the image which is captured by the camera 50, blur of the image is compensated for.

Figure 4:
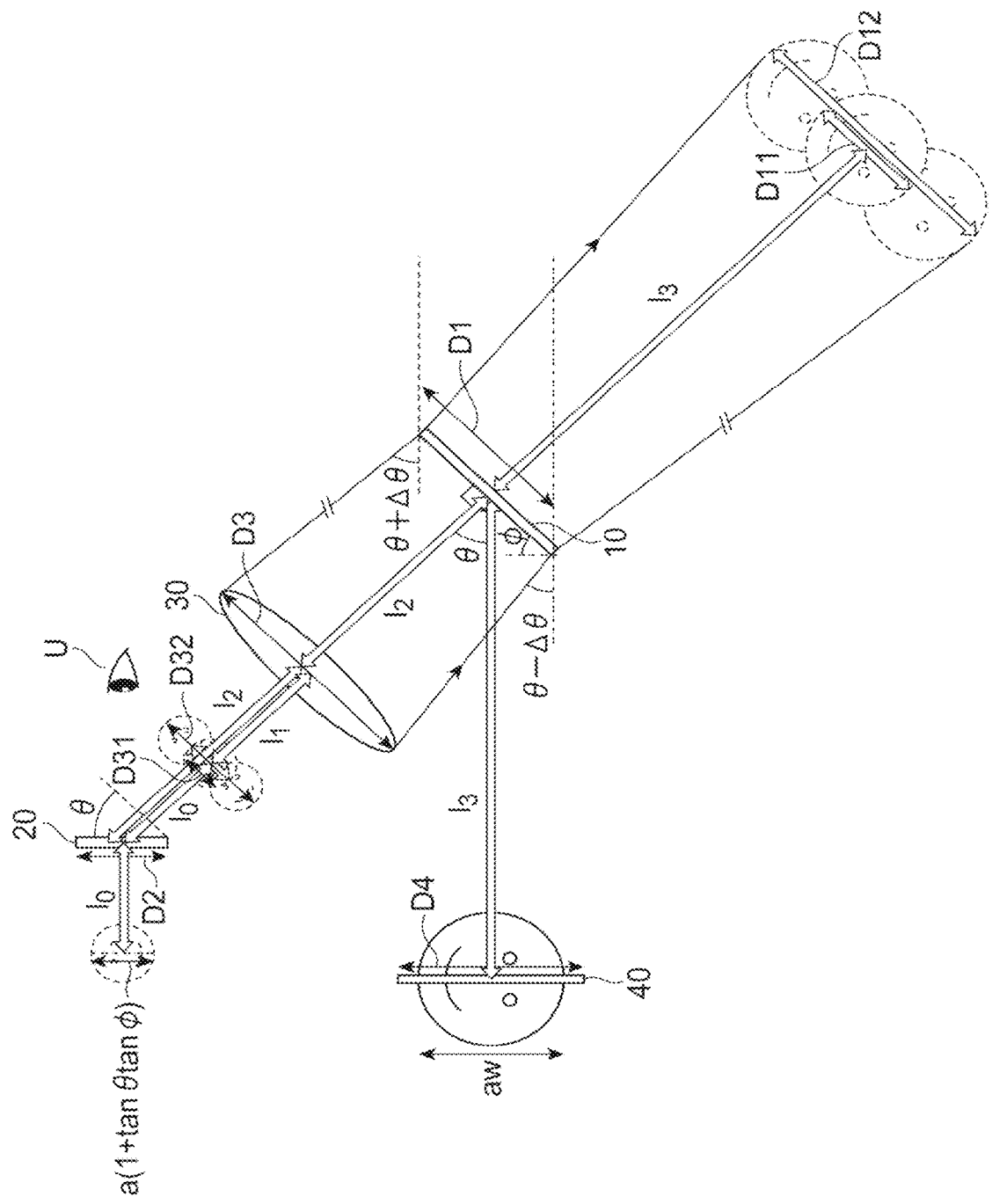
FIG. 4 is a diagram illustrating a design example of dimensions or the like of elements of the blur compensation system.

A design example of dimensions of the elements of the blur compensation system 1 and the like will be described below with reference to FIG. 4. In FIG. 4, reference signs indicating dimensions and arrangement angles of the elements are illustrated. Details of the reference signs are as follows.

a: This denotes a value which is used to represents the size of a virtual image which is formed by the mirror 20. For the purpose of convenience, a length when a virtual image formed by the mirror 20 is seen from one side is defined as a(1+ tan θ tan φ) in FIG. 4. A length of an image which is displayed by the display 40 when seen from one side is defined as aw. Here, w denotes the magnification of the lens 30.

$l_0$: This denotes a distance (a virtual image distance) indicating a depth of a virtual image which is formed by the mirror 20 with reference to a reflecting surface of the mirror 20.

$l_1$: This denotes a distance between an image which is focused on a position separated by the distance $l_0$ from the mirror 20 to the lens 30 by the lens 30 and the lens 30.

$l_2$: This denotes a distance between the mirror 20 and the lens 30 and corresponds to the sum of the distance 10 and the distance $l_1$. $l_2$ also corresponds to the distance between the lens 30 and the mirror 10.

$l_3$: This denotes a distance between the display 40 and the mirror 10. This also corresponds to a distance (a virtual image distance) indicating a depth of a virtual image which is formed by the mirror 10 with respect to the reflecting surface of the mirror 10.

θ: This denotes an optical path change angle (an angle between incident light and reflected light) of light of a specific wavelength in the mirror 10 and the mirror 20. This can be determined depending on a lattice constant, an exposure condition, an exposure wavelength, and the like.

Δθ: This denotes a difference in optical path change angle between light of the longest wavelength or light of the shortest wavelength out of the peripheral wavelengths and the light of the specific wavelength. This can be limited by the Bragg condition of an HOE or the spectrum of a light source.

φ: This denotes an arrangement angle of the mirror 10 with respect to the vertical direction.

D1: This denotes a length of the mirror 10 when seen from one side.

D11: This denotes a length of a virtual image when the virtual image which is formed by the mirror 10 is seen from one side.

D12: This denotes a total length of virtual images when the virtual images which are formed by the mirror 10 are seen from one side.

D2: This denotes a length of the mirror 20 when the mirror 20 is seen from one side.

D3: This denotes a length of the lens 30 when the lens 30 is seen from one side.

D31: This denotes a length of one image when the image focused on a position separated by the distance 1 from the mirror 20 to the lens 30 by the lens 30 is seen from one side.

D32: This denotes a total length of images when the images focused on a position separated by the distance $l_0$ from the mirror 20 to the lens 30 by the lens 30 are seen from one side.

D4: This denotes a length of the display 40 when the display 40 is seen from one side.

As described above, the blur compensation system 1 is based on, for example, a mode of use that an image reflected by the mirror 20 is presented to a user U. In this case, the dimensions of the elements of the blur compensation system 1 and the like are designed, for example, in the following sequence.

First, the mirror 20 is vertically arranged to face a user U. The display 40 is vertically arranged in a space below the mirror 20. The mirror 10 reflects an image from the display 40 toward the mirror 20. The arrangement angle φ of the mirror 10 is set to, for example, 45 degrees. The optical path change angle θ of the mirror 10 is set to 45 degrees such that light of a specific wavelength which progresses forward from the display 40 and which is reflected by the mirror 10 progresses to the mirror 20. Δθ is a value which is determined depending on the optical characteristics of the mirror 10 and is specified on the basis of design data, experiment data, and the like of the mirror 10. The magnitude of the distance $l_3$ between the display 40 and the mirror 10 may be appropriately set on the basis of the size of the blur compensation system 1. When the mirror 10 and the mirror 20 have substantially the same optical characteristics, the lens 30 is disposed at a middle position between the mirror 10 and the mirror 20. The distance between the mirror 10 and the lens 30 and the distance between the mirror 20 and the lens 30 are both $l_2$. The magnitude of the distance $l_2$ may be appropriately set on the basis of the size of the blur compensation system 1.

The magnitude of an image which is presented to the user U, that is, a(1+ tan θ tan φ), is set. Since the arrangement angle φ of the mirror 10 and the optical path change angle θ of the mirror 10 are already set, the size of the image can be set to a predetermined value by determining the dimension a. In addition, the depth of the image which is presented to the user U, that is, the value of the distance $l_0$, is set. Hereinafter, the dimensions of the elements and the like are set to realize the size and the depth of the image which is presented to the user U.

The length D2 of the mirror 20 is set to satisfy Equation (2) such that it is longer than the length of a virtual image which is formed by the mirror 20.

[Math. 2]

$$D2 > \alpha(1 + \tan\theta \tan\phi) \qquad (2)$$

The length D31 of one image of the images which are focused on a position separated by the distance $l_0$ from the mirror 20 to the lens 30 by the lens 30 is expressed by Equation (3).

[Math. 3]

$$D31 = a\frac{\cos(\theta - \varphi)}{\cos\varphi} \quad (3)$$

The total length D32 of the images which are focused on a position separated by the distance $l_0$ from the mirror 20 to the lens 30 by the lens 30 is expressed by Equation (4).

[Math. 4]

$$D32 = a\frac{\cos(\theta - \varphi)}{\cos\varphi} + \frac{(2l_3\tan\Delta\theta)}{w} \quad (4)$$

The position which is separated by the distance $l_0$ from the mirror 20 to the lens 30 is also a position which is separated by the distance $l_1$ ($l_1=l_2-l_0$) from the lens 30 to the mirror 20. The lens 30 serve to condense images with a length D31 and a length D32 which are expressed by Equations (3) and (4) on the position.

On the other hand, the display 40 displays an image such that the length when seen from one side is aw. Since the distance between the display 40 and the mirror 10 is $l_3$, the distance representing the depth of the virtual image which is formed by the mirror 10 with respect to the reflecting surface of the mirror 10 is also $l_3$.

The length D1 of the mirror 10 is set to satisfy Equation (5) such that the entire image displayed by the display 40 is incident on the mirror 10.

[Math. 5]

$$D1 > \frac{aw}{\cos\varphi} \quad (5)$$

The length D11 of one virtual image when virtual images formed by the mirror 10 are seen from one side is expressed by Equation (6).

[Math. 6]

$$D11 = aw\frac{\cos(\theta - \varphi)}{\cos\varphi} \quad (6)$$

The total length D12 of the virtual images when the virtual images formed by the mirror 10 are seen from one side is expressed by Equation (7).

[Math. 7]

$$D12 = aw\frac{\cos(\theta - \varphi)}{\cos\varphi} + 2l_3\tan\Delta\theta \quad (7)$$

The lens 30 condenses virtual images with the lengths expressed by Equations (6) and (7) on a position separated by the distance $l_1$ from the lens 30 to the mirror 20 as images with the lengths expressed by Equations (3) and (4). Since the distance between the virtual image formed by the mirror 10 and the lens 30 is $l_2+l_3$, the magnification w of the lens 30 is set as expressed by Equation (8)

[Math. 8]

$$w = \frac{l_2 + l_3}{l_1} \quad (8)$$

The size D3 of the lens 30 is set to satisfy Equation (9) such that the entire image reflected by the mirror 10 is incident thereon.

[Math. 9]

$$D3 > aw\frac{\cos(\theta - \varphi)}{\cos\varphi} + 2l_2\tan\Delta\theta \quad (9)$$

For example, as described above, the dimensions of the elements of the blur compensation system 1 and the like are designed.

Figure 5:
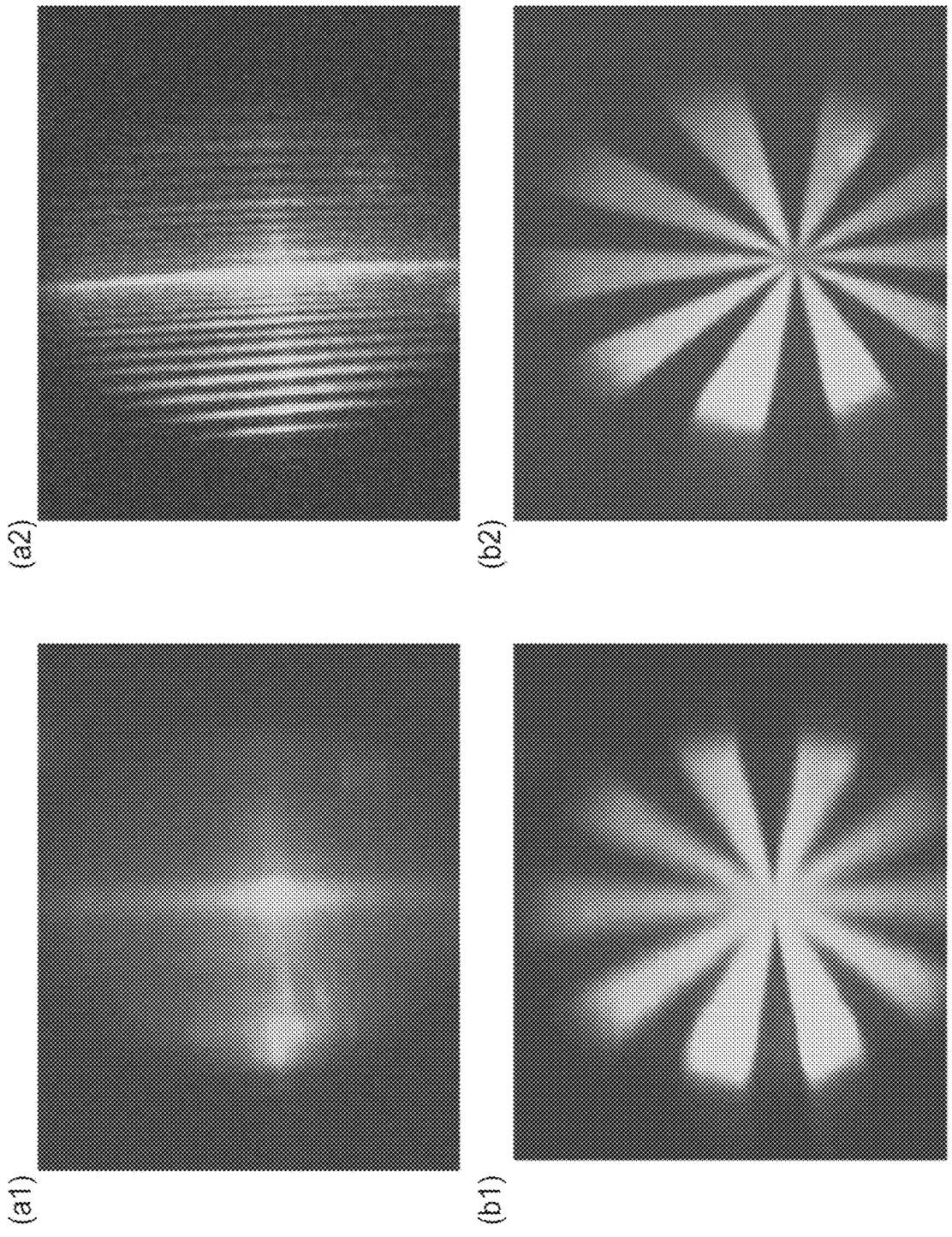
FIG. 5 is a diagram illustrating an example of an effect of blur compensation.

FIG. 5 is a diagram illustrating an example (an experiment result) of an effect of the blur compensation by the blur compensation system 1. In (a1) of FIG. 5, an example of an image which constitutes one scene of an image when blur compensation has not been performed is illustrated. This image can correspond to an image which is seen by a user U, for example, when light of an image F from the display 40 is directly reflected by the mirror 20 without using the mirror 10 and the lens 30 in the blur compensation system 1 illustrated in FIG. 1. Alternatively, this image can correspond to an image when light of an image F reflected by the mirror 20 is directly imaged by the camera 50 without using the lens 30 and the mirror 10 in the blur compensation system 1 illustrated in FIG. 2. On the other hand, (a2) of FIG. 5 illustrates an example of an image which constitutes one scene of an image when blur compensation by the blur compensation system 1 has been performed. As illustrated in (a2) of FIG. 5, it can be understood that blur is curbed by performing blur compensation using the blur compensation system 1. Although the size of the image illustrated in FIG. 5 is not equal to the actual size thereof, it has been ascertained in the experiment that the blur size b in (a1) of FIG. 5 is about 1 mm which can be recognized, but the blur in (a2) of FIG. 5 is reduced to such an extent that the blur cannot be recognized.

Similarly, (b1) and (b2) of FIG. 5 illustrate examples of one scene of an image when blur compensation has been performed and when blur compensation has not been performed. It can be understood from (b1) and (b2) of FIG. 5 that blur is curbed by performing blur compensation using the blur compensation system 1. In the experiment, it has been ascertained that the blur size b in (b1) of FIG. 5 is about 1 mm which can be recognized, but the blur in (b2) of FIG. 5 is reduced to such an extent that the blur cannot be recognized.

In the above-mentioned blur compensation system 1, the mirror 10 reflects light of a specific wavelength such that an incidence angle and a reflection angle thereof are different from each other. The mirror 10 which is designed in this way reflects light of a peripheral wavelength of the specific wavelength at a reflection angle which deviates from the reflection angle of the light of the specific wavelength. Accordingly, blur is generated in an image which is formed by light of an image F reflected by the mirror 10. For example, as illustrated in FIG. 1, this can be understood in that the positions of the virtual images F11$i$, F12$i$, and F13$i$ based on the light of the wavelengths deviate from each other in the virtual image F10$i$ of the image F formed by the mirror 10. Here, in the blur compensation system 1, the lens 30 changes the direction of light of an image which is reflected by the mirror 10 such that light of a peripheral wavelength out of the light of the image reflected by the mirror 10 is reflected in the same direction as the light of the specific wavelength in the mirror 20. That is, as described above with reference to FIG. 1, blur which is generated due to the mirror 10 is compensated for by the mirror 20 and the lens 30. As described above with reference to FIG. 2, blur which is generated due to the mirror 20 is compensated for by the mirror 10 and the lens 30. Accordingly, it is possible to curb blur which is generated when an optical element of which an incidence angle and a reflection angle such as the mirror 10 and/or the mirror 20 is used.

The mirror 10 and the mirror 20 may have optical characteristics with which a relationship between an incidence angel and a reflection angle of light of a specific wavelength in the mirror 10 is substantially the same as a relationship between an incidence angle and a reflection angle of the light of the specific wavelength in the mirror 20. In this case, the lens 30 may change the direction of light of an image F which is reflected by the mirror 10 such that a difference (angles $\beta12$ and $\beta32$) between an incidence angle of the light of the specific wavelength and an incidence angle of light of a peripheral wavelength at an incidence position of the light of the specific wavelength on the mirror 20 out of the light of the image F which is reflected by the mirror 10 matches a difference (angles $\alpha12$ and $\alpha32$) between a reflection angle of the light of the specific wavelength and a reflection angle of light of a peripheral wavelength at an emission position of the light of the specific wavelength in the mirror 10. In this case, the blur compensation system 1 can be easily embodied using the mirror 10 and the mirror 20 having substantially the same optical characteristics.

The mirror 10 may have light of an image F displayed by the display 40 provided at a predetermined position incident thereon, and the lens 30 may be a condensing lens. In this case, since a real image has been already formed by the display 40, it is not necessary to provide an element for forming a real image based on the light of the image F on the optical axis subsequent to the mirror 10. Since the light of the image F is condensed by the lens 30, the area of a part of the mirror 20 on which the light of the image is incident may be reduced. Accordingly, it may be possible to reduce the size of the mirror 20.

The optical path L of the light of the image F may be more greatly changed by using the mirror 10 and the mirror 20 which are reflective optical elements, for example, in comparison with a case in which a transmissive optical element is used. As a result, it is possible to improve degrees of freedom in arrangement of the optical elements such as the mirror 10, the mirror 20, and the lens 30. It may be possible to compact the entire configuration of the blur compensation system 1.

Reflected light of various orders may be used in combination as reflected light of the mirror 10 and the mirror 20. For example, an example in which −1$^{st}$-order reflected light of the same order is used as reflected light of the mirror 10 and the mirror 20 has been described above. However, +1$^{st}$-order reflected light may be used instead of the −1$^{st}$-order reflected light.

The above-mentioned blur compensation system 1 is merely an embodiment in which reflective optical elements such as the mirror 10 and the mirror 20 are used as the first optical element and the second optical element. It will be understood by those skilled in the art that blur can also be curbed in the same principle when transmissive optical elements are used as the first optical element and the second optical element. Accordingly, with the blur compensation system according to this embodiment, it is possible to curb blur which is generated when an optical element of which an incidence angle and an emission angle are different from each other is used.

Applications of the blur compensation system 1 will be described below with reference to FIGS. 6 to 8.

Figure 6:
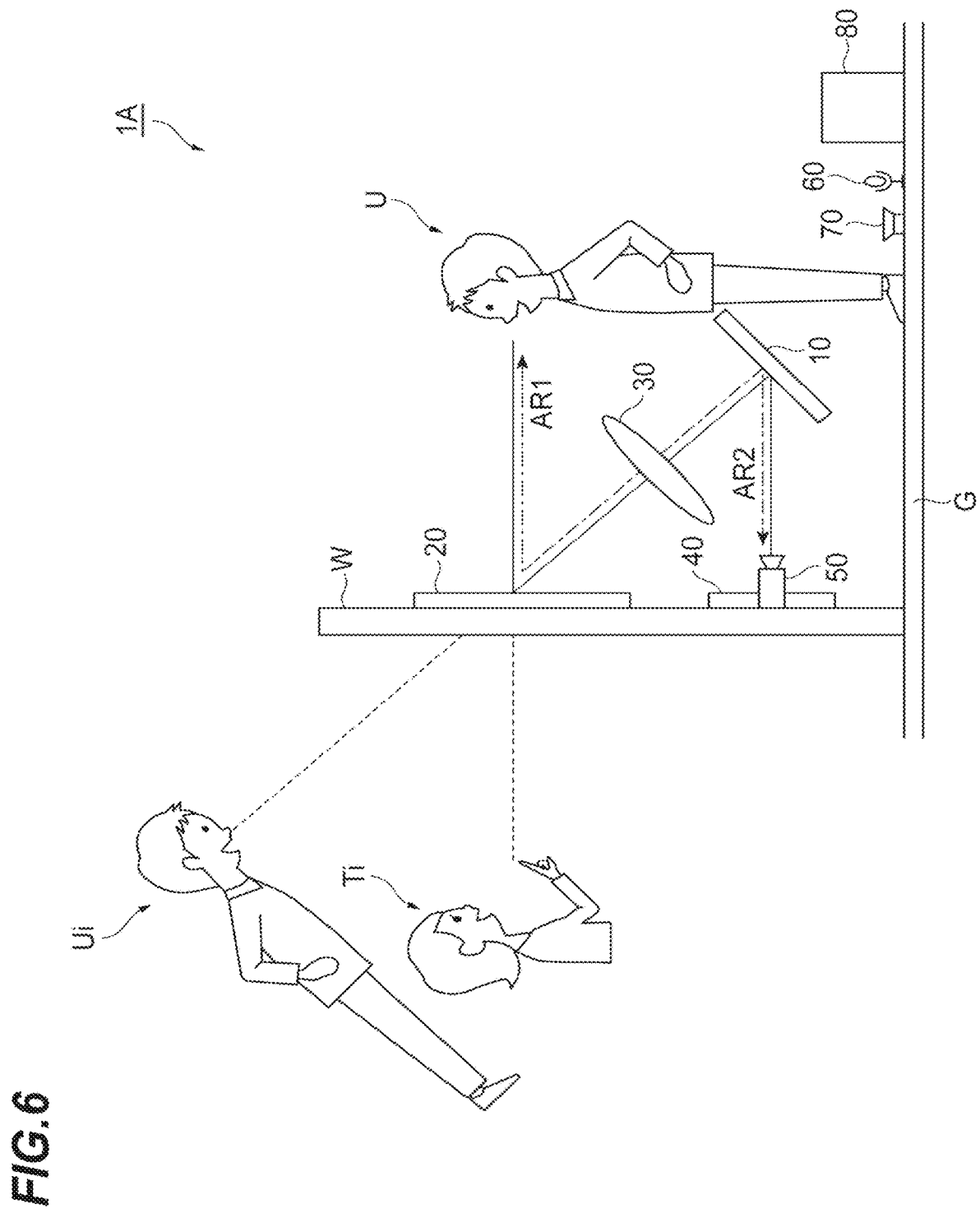
FIG. 6 is a diagram schematically illustrating a configuration of an image presentation system to which the blur compensation system is applied.

FIG. 6 is a diagram illustrating an application example of the blur compensation system. In this example, the blur compensation system is used as an image presentation system 1A. The image presentation system 1A is used for, for example, interactive communication. An example of the interactive communication is a video telephone. FIG. 6 illustrates a state in which a user U converses with a user T (a virtual image Ti appears in FIG. 6) who is a conversation partner of the user U using the image presentation system 1A. An image in which the user T appears to be present in front of the user U is presented to the user U. The user T uses an image presentation system 1A different from the image presentation system 1A which is used by the user U in a place other than the place of the user U. An image of the user U (a virtual image Ui of the user U) which is captured by the camera 50 is presented to the user T. An image in which the user U appears to be present in front of the user T is presented to the user T.

The image presentation system 1A includes a mirror 10, a mirror 20, a lens 30, a display 40, a camera 50, a microphone 60, a speaker 70, and a control device 80. The detailed configurations of the mirror 10, the mirror 20, and the lens 30 and the principle of blur compensation are the same as described above with reference to FIGS. 1 and 2 and the like and thus description thereof will not be repeated.

In the image presentation system 1A, the display 40 displays an image of the user T to the mirror 10. That is, light of the image of the user T is output from the display 40. The number of frames for displaying an image in the display 40 is, for example, 60 frames/second. The display 40 can be controlled by the control device 80 which will be described later such that a state in which an image is displayed (ON) and a state in which an image is not displayed (OFF) are alternately switched.

The camera 50 captures an image of the mirror 10. The number of frames which are captured by the camera 50 is, for example, 60 frames/second. The camera 50 can be controlled by the control device 80 which will be described later such that a state in which imaging is performed (ON) and a state in which imaging is not performed (OFF) are alternately switched.

The microphone 60 collects surrounding sound including the voice of the user U. The speaker 70 outputs sound including the voice of the user T. The control device 80 controls the elements such as the display 40, the camera 50, the microphone 60, and the speaker 70 which are included in the blur compensation system 1. The functions of the control device 80 will be described later with reference to FIG. 7.

The blur compensation system 1 is used, for example, indoor. In the example illustrated in FIG. 6, the mirror 20, the display 40, and the camera 50 are provided on a wall W. In this example, the wall W is provided vertical with respect to the floor G, and the mirror 20 and the display 40 provided on the wall W are also provided vertical with respect to the floor G. When seen from the mirror 10, the camera 50 can be arranged to be located in the same direction as the display 40. For example, when seen from the mirror 10, the display 40 and the camera 50 may be arranged in parallel (for example, arranged adjacent to each other). Elements other than the mirror 20, the display 40, and the camera 50 which are provided on the wall W, that is, the mirror 10, the lens 30, the microphone 60, the speaker 70, and the control device 80, are arranged on the user U side than the wall W. The microphone 60, the speaker 70, and the control device 80 are arranged in a part on the floor G on the user U side than the wall W. The user U uses the image presentation system 1A at a position facing the mirror 20.

In the image presentation system 1A, in the same principle as described above with reference to FIGS. 1 and 2, an image of the user T from the display 40 is reflected by the mirror 10, passes through the lens 30, and is then reflected to the user U by the mirror 20 (arrow AR1). That is, the image of the user T is presented to the user U. When the mirror 20 is configured to transmit light other than light of a specific wavelength, an image in which the user T appears to rise in the front space located on the side opposite to the user U with the mirror 20 interposed therebetween is presented to the user U. The image of the user U is reflected by the mirror 20, passes through the lens 30, and is then reflected to the camera 50 by the mirror 10 (arrow AR2). Accordingly, the image of the user U is captured by the camera 50. When the camera 50 is arranged to be located in substantially the same direction as the display 40 when seen from the mirror 10 as described above, the camera 50 can capture an image of the user U on the almost front side.

Figure 7:
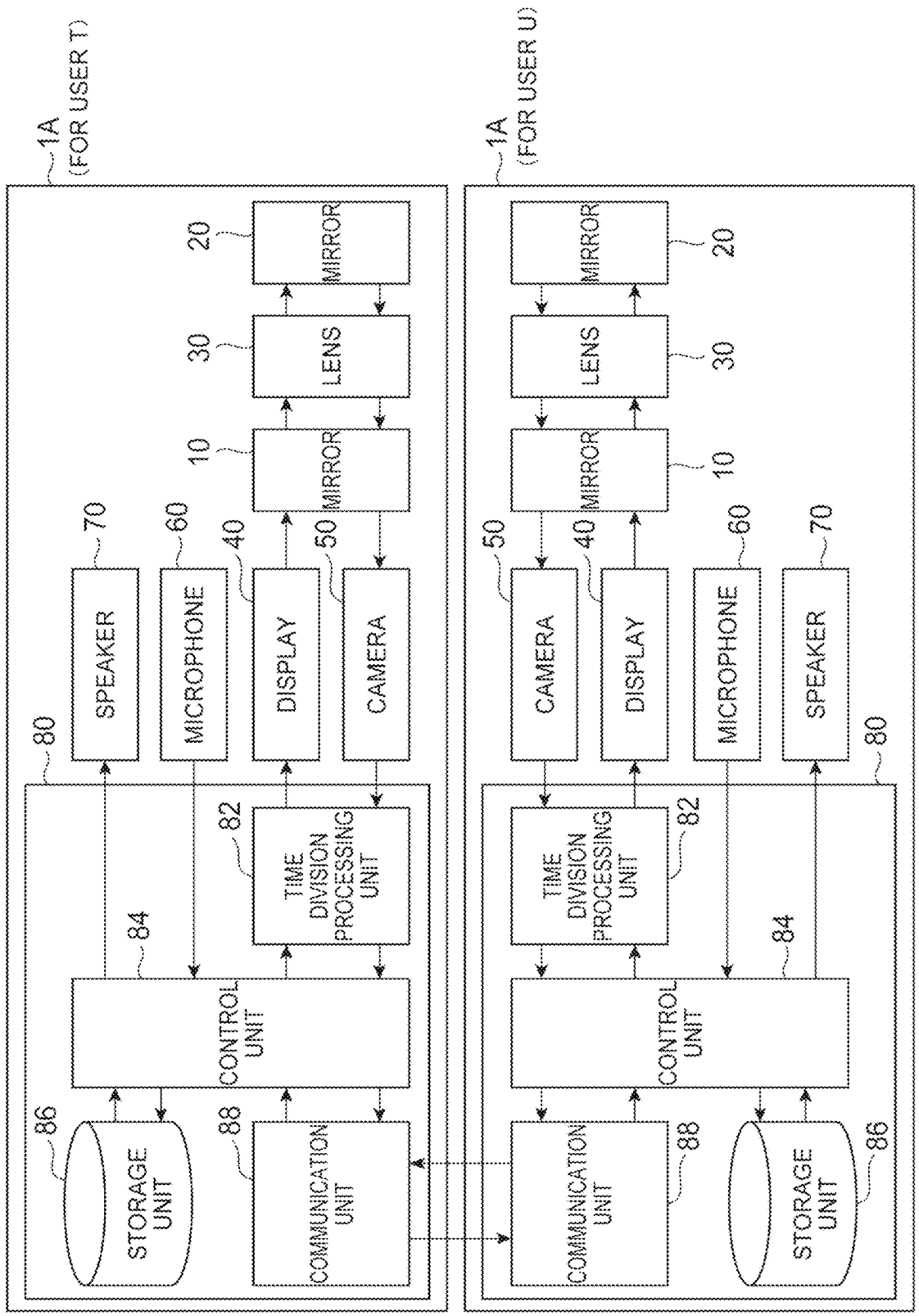
FIG. 7 is a diagram illustrating an example of functional blocks of the image presentation system.

FIG. 7 is a block diagram illustrating an example of the configuration of the image presentation system 1A illustrated in FIG. 6. FIG. 6 is a block diagram illustrating two image presentation systems 1A that can communication with each other. One image presentation system 1A is used by the user U and the other blur compensation system 1 is used by the user T.

The mirror 10, the mirror 20, the lens 30, the display 40, the camera 50, the microphone 60, and the speaker 70 included in the image presentation system 1A are the same as described above with reference to FIG. 6. In FIG. 7, an example of a block diagram of the control device 80 is also illustrated. The control device 80 can be physically configured as a computer device including a processor, a memory, a storage, a communication device, an input device, and an output device and the like. The control device 80 is electrically connected to elements such as the display 40, the camera 50, the microphone 60, and the speaker 70 and can control the elements. The control device 80 includes a time division processing unit 82, a control unit 84, a storage unit 86, and a communication unit 88 as functional blocks thereof.

The following process which is performed by the time division processing unit 82 is used to prevent the image of the user T which is displayed by the display 40 from being captured by the camera 50. For example, in the arrangement configuration of the display 40 and the camera 50 illustrated in FIG. 6, since the display 40 is not located within an imaging range of the camera 50, the process of the time division processing unit 82 is not required. On the other hand, in the arrangement configuration of the display 40 and the camera 50 illustrated in FIG. 8 which will be described later, there is a likelihood that the display 40 will be located within the imaging range of the camera 50, and the time division processing unit 82 may be used in this case.

Specifically, the time division processing unit 82 performs a process (a time division process) of sequentially alternately performing a mode (a display mode) in which an image is displayed by the display 40 and a mode (an introduction mode) in which an image captured by the camera 50 is introduced. In the display mode, the image of the user T is displayed by the display 40. In the introduction mode, display of the image by the display 40 is interrupted (stopped) and an image captured by the camera 50 is introduced.

For example, the time division processing unit 82 divides one second into 120 frames and alternately performs the introduction mode and the display mode every frame. In this case, the time division processing unit 82 controls the display 40 such that an image is displayed in 60 frames in which the display mode is performed out of 120 frames. The time division processing unit 82 may control the camera 50 such that an image is captured in 60 frames in which the introduction mode is performed out of 120 frames or may control the camera 50 such that an image is captured in all of 120 frames. In the latter, for example, images corresponding to 60 frames in which the introduction mode is performed out of the images corresponding to 120 frames captured by the camera 50 are thinned out and introduced.

When the time division process by the time division processing unit 82 is not employed, an image captured by the camera 50 is introduced at 60 frames/second without any change and the image of the user T received by the communication unit 88 may be displayed at 60 frames/second by the display 40 without any change.

The control unit 84 is a unit that controls the control device 80 as a whole by controlling the elements of the control device 80. The storage unit 86 is a unit that stores a variety of information which is required for processes performed by the control device 80. For example, the storage unit 86 stores programs for realizing the functions of the control device 80 and the control unit 84 executes a program read from the storage unit 86. The communication unit 88 is a unit that communicates with the outside of the image presentation system 1A. In the example illustrated in FIG. 6, the image presentation system 1A which is used by the user U and the image presentation system 1A which is used by the user T communicate with each other via the communication units 88.

The outline of the operation of the image presentation system 1A will be described below with reference to FIG. 6 along with FIG. 7.

In the image presentation system 1A which is used by the user U, an image of the user U (a virtual image Ui) which is reflected by the mirror 20, passes through the lens 30, and is reflected by the mirror 10 is captured by the camera 50. The image of the user U captured by the camera 50 is transmitted to the communication unit 88 of the image presentation system 1A which is used by the user T via the communication unit 88. In the image presentation system 1A which is used by the user T, the image of the user U received by the communication unit 88 is displayed to the mirror 10 by the display 40. The image of the user U is reflected by the mirror 10, passes through the lens 30, and is reflected to the user T by the mirror 20. That is, the image of the user U is presented to the user T.

Similarly, in the image presentation system 1A which is used by the user U, the microphone 60 collects speech of the user U. The sound collected by the camera 50 is transmitted to the communication unit 88 of the image presentation system 1A which is used by the user T via the communication unit 88. In the image presentation system 1A which is used by the user T, the sound received by the communication unit 88 is output from the microphone 60. The user T can hear the speech of the user U.

In the image presentation system 1A which is used by the user T, an image of the user T (a virtual image Ti) which is reflected by the mirror 20, passes through the lens 30, and is reflected by the mirror 10 is captured by the camera 50. The image of the user T captured by the camera 50 is transmitted to the communication unit 88 of the image presentation system 1A which is used by the user U via the communication unit 88. In the image presentation system 1A which is used by the user U, the image of the user T received by the communication unit 88 is displayed to the mirror 10 by the display 40. The image of the user T is reflected by the mirror 10, passes through the lens 30, and is reflected to the user U by the mirror 20. That is, the image of the user T is presented to the user U.

Similarly, in the image presentation system 1A which is used by the user T, the microphone 60 collects speech of the user T. The sound collected by the microphone 60 is transmitted to the communication unit 88 of the image presentation system 1A which is used by the user U via the communication unit 88. In the image presentation system 1A which is used by the user U, the sound received by the communication unit 88 is output from the microphone 60. The user U can hear the speech of the user T.

As described above, interactive communication between the user U and the user T is realized by transmitting and receiving images and speech of the users between the image presentation systems 1A which are used by the user U and the user T. Since the image presentation system 1A is an application of the blur compensation system 1 (see FIGS. 1 and 2), blur in the image of the user T which is presented to the user U has been compensated for. Similarly, blur in the image of the user U which is captured by the camera 50 has been compensated for.

In the image presentation system 1A, since the mirror 20 of which an incidence angle and a reflection angle are different from each other is used, it may be possible to further improve a degree of freedom in system design including the arrangement angle of the mirror 20, for example, in comparison with a case in which a half mirror having regular reflection characteristics is used as described in Non-Patent Literature 1. For example, by arranging the mirror 20 vertically, a space in the horizontal direction in the image presentation system 1A can be reduced. This is because a general mirror forms a virtual image at a position with plane symmetry but an optical element such as a DOE or an HOE can form a virtual image at a position without plane symmetry. By arranging the mirror 10, the lens 30, the microphone 60, the speaker 70, and the control device 80 to be the user U side than the wall W (that is, than the mirror 20), a space for arranging other elements may not be required in the rear of the mirror 20.

In the image presentation system 1A, the camera 50 can capture an image of the user U in the almost front thereof. In this case, a line of sight of the user U in the image of the user U which is presented to the user T is substantially the same as the line of sight when the user U faces the user T from their fronts. The same is true of the line of sight of the user T in the image which is presented to the user U. As a result, communication including eye contact between the user U and the user T is possible.

An example in which both the user U and the user T use the image presentation systems 1A has been described above, but a configuration in which only one of the user U and the user T uses the image presentation system 1A and the other thereof uses a television telephone system in the related art can also be considered.

An example in which the image presentation system 1A has both an image presenting function of presenting an image to the user U and an imaging function of capturing an image of the user U using the camera 50 has been described above. However, the image presentation system 1A has only to have at least one function of the image presenting function and the imaging function.

When the image presentation system 1A does not have an imaging function, the image presentation system 1A can have a configuration not including the camera 50. In this case, interactive communication between the user U and the user T can be realized in a configuration in which the image of the user U is not presented to the user T. The image presentation system is not limited to interactive communication and may be merely used to present a certain image to the user U.

When the image presentation system 1A does not have the image presenting function, the image presentation system 1A can have a configuration not including the display 40. In this case, interactive communication between the user U and the user T can be realized in a configuration in which the image of the user T is not presented to the user U. The image presentation system is not limited to interactive communication, and may be merely used to image the user U.

Figure 8:
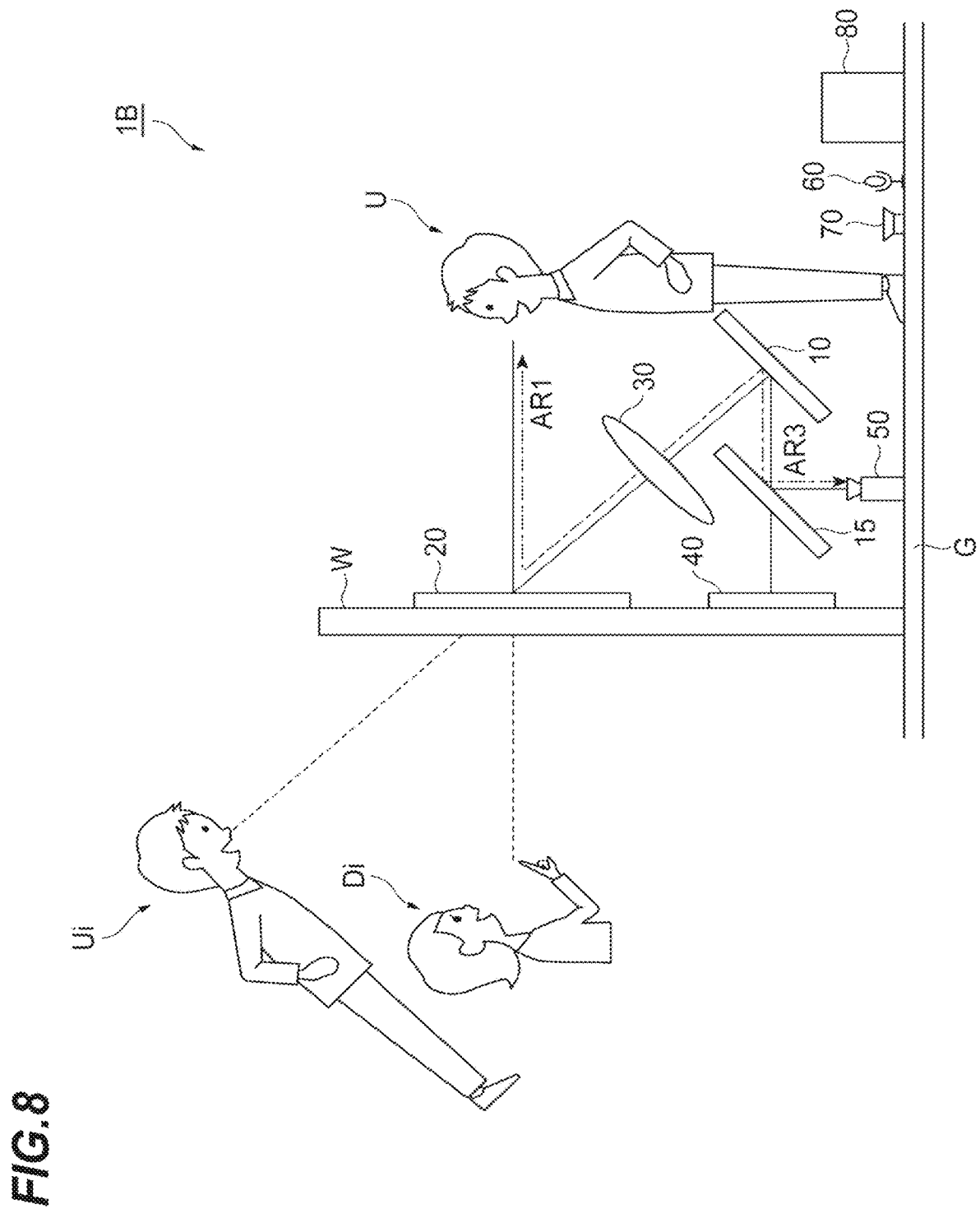
FIG. 8 is a diagram schematically illustrating a configuration of an image presentation system according to a modified example.

FIG. 8 is a diagram schematically illustrating a configuration of an image presentation system according to a modified example. An image presentation system 1B illustrated in FIG. 8 is different from the image presentation system 1A (FIG. 7), in that a half mirror 15 is further provided and the arrangement of the camera 50 is different.

The half mirror 15 is arranged on an optical path between the display 40 and the mirror 10. The camera 50 is arranged at a position on which light of an image of the user U from the mirror 10 reflected by the half mirror 15 is incident. In this example, the camera 50 is arranged on the floor G below the half mirror 15. For example, light with 50% light intensity of the light of the image of the user U which is reflected by the mirror 20, passes through the lens 30, and is reflected by the mirror 10 is reflected to the camera 50 by the half mirror 15 (arrow AR3). Accordingly, the image of the user U (the virtual image Ui) is captured by the camera 50. For example, light with rest 50% light intensity of the light of the image of the user T from the display 40 is transmitted by the half mirror 15, is reflected by the mirror 10, passes through the lens 30, and is reflected to the user U by the mirror 20 (arrow AR1). Accordingly, the image of the user T (the virtual image Ti) is presented to the user U.

In the image presentation system 1A described above with reference to FIG. 6, the camera 50 can capture an image of the user U substantially from its front. On the other hand, in the image presentation system 1B, the camera 50 can capture an image of the user U accurately from its front using the half mirror 15. In this case, the line of sight of the user U in the image of the user U which is presented to the user T is the same as the line of sight when the user U faces the user T from their fronts. The same is true of the line of sight of the user T in the image which is presented to the user U. Accordingly, communication including eye contact between the user U and the user T can be made to be more real.

In the image presentation system 1B, there is a likelihood that the display 40 will be located within the imaging range of the camera 50 depending on the positional relationship between the display 40 and the camera 50, the magnitude of a viewing angle, and the like. In this case, by performing the time division process in the time division processing unit 82 of the control device 80, it is possible to prevent the image of the user T which is displayed by the display 40 from being captured by the camera 50 and to compatibly perform presentation of the image of the user T to the user U and imaging of the user U. The time division process may be made to be unnecessary by adjusting the positional relationship between the display 40 and the camera 50, the magnitude of a viewing angle, and the like such that the image displayed by the display 40 does not appear in the camera 50.

While an embodiment of the invention has been described above, the invention is not limited to the embodiment. For example, in the embodiment, a configuration in which a lens is used as the third optical element in the blur compensation system has been described above, but a diffusing screen may be used as the third optical element.

Figure 9:
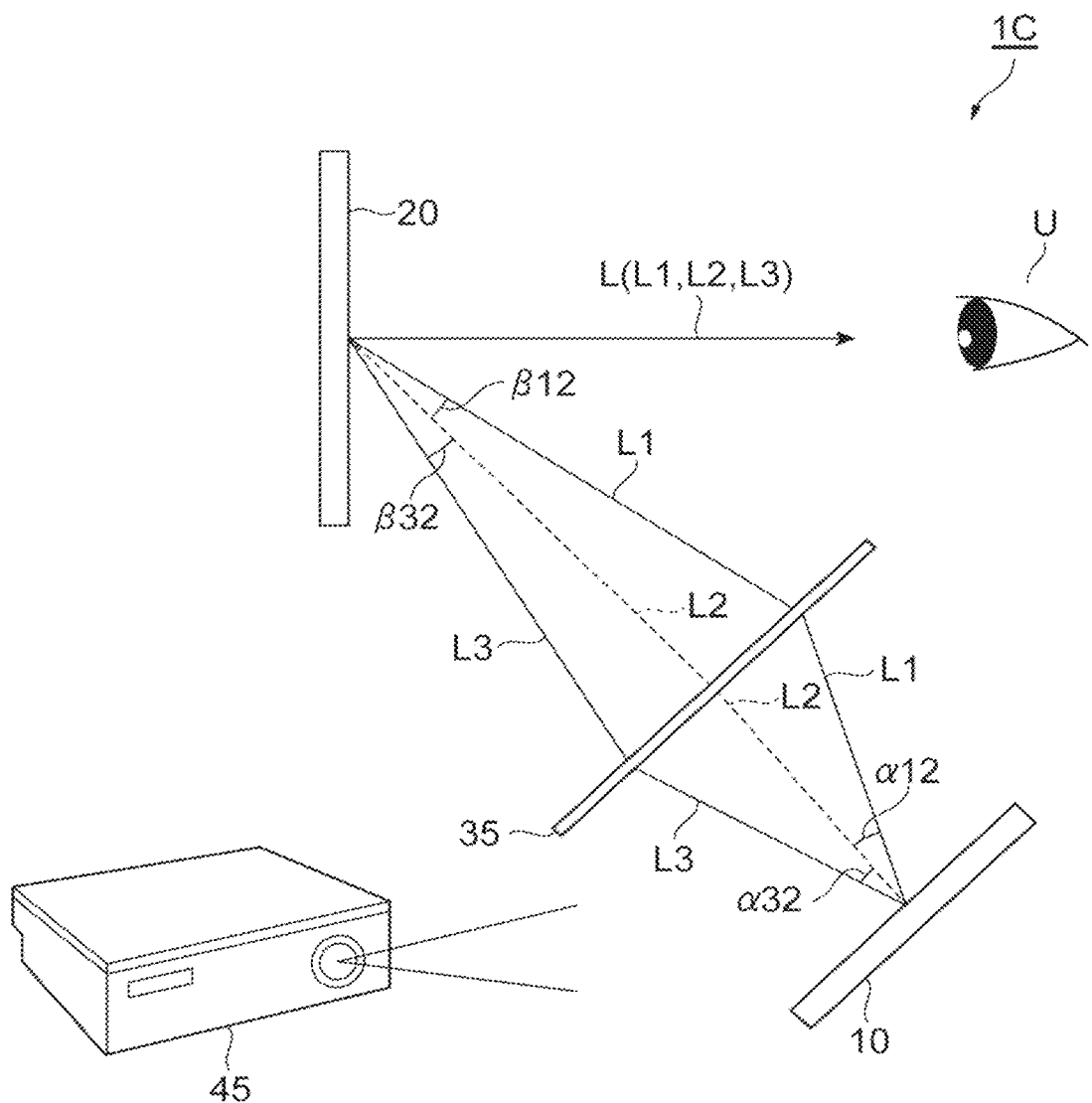
FIG. 9 is a diagram schematically illustrating a configuration of a blur compensation system according to a modified example.

A blur compensation system 1C illustrated in FIG. 9 is different from the blur compensation system 1 (FIG. 1) and the image presentation system 1A (FIG. 7), in that a screen 35 is included instead of the lens 30. The blur compensation system 1C may further include a projector 45.

The projector 45 outputs (projects) light of an image to the mirror 10. The light of an image from the projector 45 is projected to an element that diffuses light such as a diffusing screen and first forms an image, and thus is different from the light of an image from the display 40.

The screen 35 is arranged on an optical axis of light between the mirror 10 and the mirror 20 and changes a direction of light which is reflected by the mirror 10. In the example illustrated in FIG. 9, the screen 35 is arranged such that the rear surface of the screen 35 faces the mirror 10. In this example, the screen 35 is a rear plane type diffusing screen that receives light from the mirror 10 via the rear surface thereof and displays an image on the front surface thereof, and is a transmissive optical element.

Change of the direction of the light of an image by the screen 35 is performed in the same principle as by the lens 30 in the blur compensation system 1 (FIG. 1). An image which is actually displayed by the screen 35 includes a lot of light spots, and light diffuses and progresses in a plurality of directions from the light spots. As described above with reference to FIGS. 1 and 2, for the purpose of easy understanding, an optical path of light passing through one light spot on the screen 35 is illustrated in FIG. 9. For the purpose of easier understanding, similarly to FIG. 1, an optical path of light of an image is referred to by an optical path L in FIG. 9. An optical path of light of a specific wavelength is referred to by an optical path L2, and an optical path of light of a wavelength on a short wavelength side and an optical path of light of a wavelength on a long wavelength side are referred to by an optical path L1 and an optical path L3, respectively. A difference between a reflection angle of the light of the specific wavelength and a reflection angle of light of a wavelength on the short wavelength side at an incidence position of the light of the specific wavelength on the mirror 10 is illustrated as an angle α12. A difference between the reflection angle of the light of the specific wavelength and the reflection angle of light of a wavelength on the short wavelength side is illustrated as an angle α12. A difference between an incidence angle of the light of the specific wavelength and an incidence angle of light of a wavelength on the short wavelength side at an incidence angle of the light of the specific wavelength on the mirror 20 is illustrated as an angle β12. A difference between the incidence angle of the light of the specific wavelength and the incidence angle of light of a wavelength on the long wavelength side is illustrated as an angle β32.

The screen 35 changes the direction of the light of an image which is reflected by the mirror 10 such that light of a peripheral wavelength out of the light of an image which is reflected by the mirror 10 is emitted in the same direction as the light of the specific wavelength from the emission position of the light of the specific wavelength on the mirror 20. When the mirror 10 and the mirror 20 have substantially the same optical characteristics, the screen 35 is arranged at the middle position between the mirror 10 and the mirror 20.

Specifically, the screen 35 changes the direction of the light of an image (that is, the optical path L1 and the optical path L3) which is reflected by the mirror 10 such that the angle β12 and the angle β32 match the angle α12 and the angle α32, respectively.

In this way, similarly to the lens 30 described above with reference to FIG. 1, the direction of the light of an image which is reflected by the mirror 10 is also changed by the screen 35. Accordingly, blur which is generated due to the mirror 10 is compensated for by the screen 35 and the mirror 20. Blur in the image which is presented to the user U is compensated for.

In the blur compensation system 1C, light of an image which is output from the projector 45 provided at a predetermined position is incident on the mirror 10, and the third optical element is the screen 35 (the diffusing screen). In this case, since a real image based on the light of an image can be formed by the screen 35, an element for forming a real image based on the light of an image such as the display 40 does not need to be provided on the optical axis from the screen 35 to the projector 45 side.

An example in which the mirror 10 which is a reflective optical element is used as the first optical element has been described above, but a transmissive optical element may be used as the first optical element.

Figure 10:
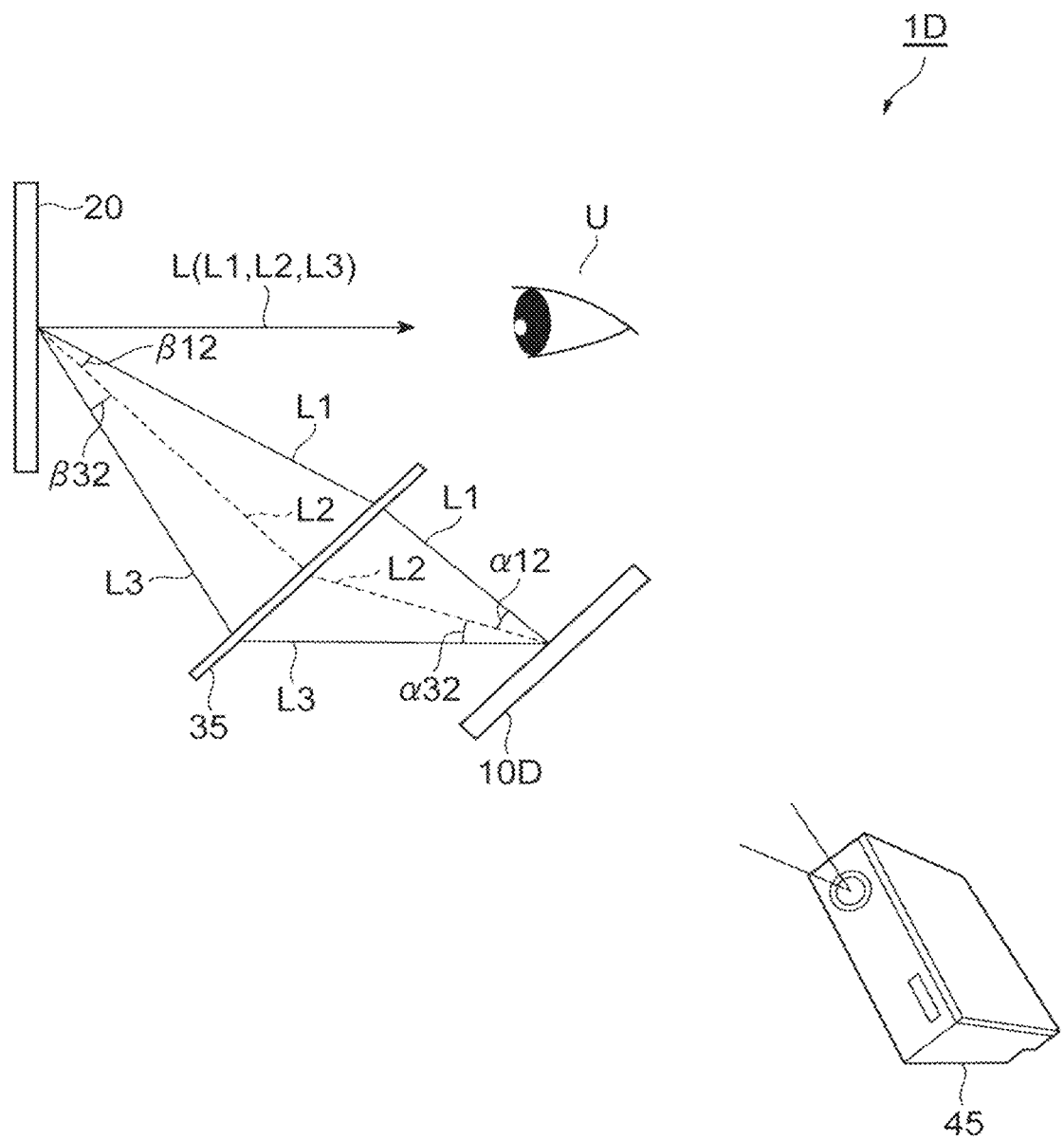
FIG. 10 is a diagram schematically illustrating a configuration of a blur compensation system according to a modified example.

A blur compensation system 1D illustrated in FIG. 10 is different from the blur compensation system 1C (FIG. 9), in that a transmissive diffraction grating 10D is provided instead of the mirror 10 and the arrangement of the projector 45 is different.

The transmissive diffraction grating 10D receives light of an image from the projector 45 via the rear surface thereof and emits light of an image from the front surface thereof. The transmissive diffraction grating 10D transmits light of a specific wavelength such that an incidence angle and an emission angle are different from each other. The transmissive diffraction grating 10D is an optical element such as a DOE or an HOE and emits light of a peripheral wavelength at an emission angle which deviates from the emission angle of the light of the specific wavelength. In the blur compensation system 1D, the transmissive diffraction grating 10D and the mirror 20 have optical characteristics that a relationship between an incidence angle and an emission angle of light of a specific wavelength in the transmissive diffraction grating 10D and a relationship between an incidence angle and an emission angle of the light of the specific wavelength on the mirror 20 are substantially the same.

The projector 45 outputs light of an image of the user T to the rear surface of the transmissive diffraction grating 10D.

With the blur compensation system 1D, for example, since the projector 45 can be arranged in the back of the transmissive diffraction grating 10D, the degree of freedom in system design is improved.

Figure 11:
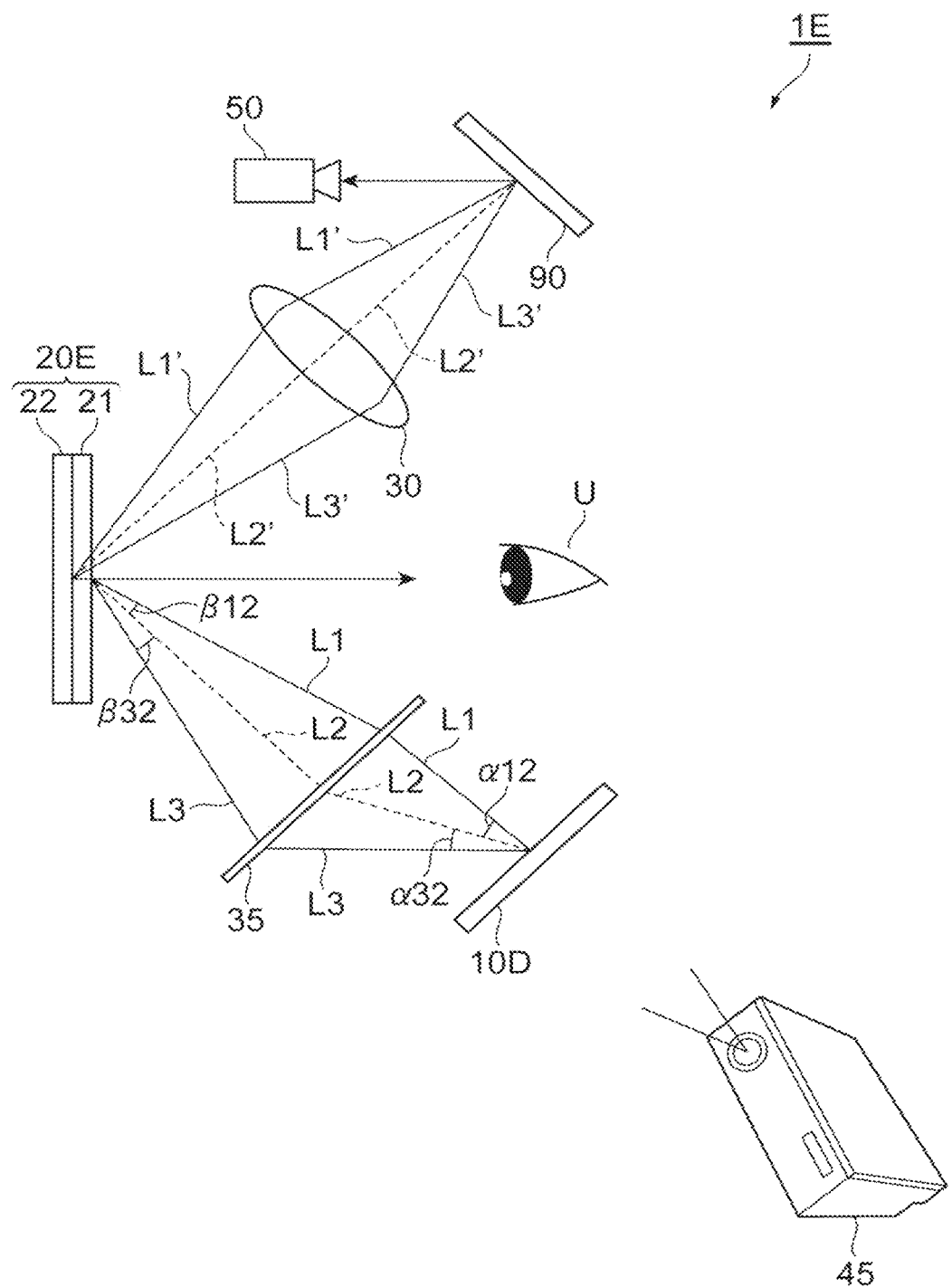
FIG. 11 is a diagram schematically illustrating a configuration of a blur compensation system according to a modified example.

In a system configuration using the transmissive diffraction grating 10D, the user U can be imaged using the camera 50. For example, a blur compensation system 1E illustrated in FIG. 11 is different from the blur compensation system 1D (FIG. 10), in that a mirror 20E is provided instead of the mirror 20 and a lens 30, a camera 50, and a mirror 90 are additionally provided.

The mirror 20E have two reflection characteristics of reflecting light of an image from the projector 45 to the user U and reflecting an image of the user U to the lens 30. The mirror 20E is formed, for example, by double exposing an HOE or superimposing two mirrors having different reflection characteristics. In the example illustrated in FIG. 11, the mirror 20E includes two mirrors 21 and 22 which are superimposed.

For example, the mirror 21 is designed to reflect light of an image output from the projector 45 and to transmit light of a wavelength other than the wavelength of the light of the image. In this case, the mirror 21 is designed to have substantially the same optical characteristics as the mirror 10. The mirror 21 reflects the light of an image from the projector 45 to the user U. Since blur which is generated due to the mirror 10 is compensated for in the same principle of blur compensation as described above, blur in an image which is presented to the user U is compensated for.

On the other hand, the mirror 22 is designed to reflect light of at least a part of wavelengths other than the wavelength of the light of an image output from the projector 45. The wavelengths of the light which is reflected by the mirror 22 include at least a part of the wavelengths of the light constituting an image of the user U.

Accordingly, the mirror 22 reflects the image of the user U to the lens 30.

The lens 30 is arranged at a position different from the screen 35. For example, the lens 30 is arranged above the screen 35 such that the lens 30 and the screen 35 are arranged with axis symmetry with respect to the normal line of the mirror 20. The lens 30 causes light reflected by the mirror 22 to be incident on the mirror 90.

The mirror 90 is an optical element such as a DOE or an HOE. The mirror 22 and the mirror 90 are designed to have substantially the same optical characteristics. The mirror 90 reflects light from the lens 30 to the camera 50. Out of an optical path of light which is reflected by the mirror 22, passes through the lens 30, and reaches the mirror 90, it is assumed that an optical path of light of a specific wavelength is defined as an optical path L2', an optical path of light of a wavelength on the short wavelength side is defined as L1 and an optical path of light of a wavelength on the long wavelength side is defined as L3'. Then, since the optical paths L1' to L3' match between the mirror 90 and the camera 50 in the same principle of blur compensation as described above, blur which is generated due to the mirror 22 is compensated for. Accordingly, blur in an image captured by the camera 50 is compensated for.

While an embodiment has been described above in detail, it will be apparent to those skilled in the art that embodiments are not limited to the description in this specification. Embodiments can be embodied in corrected and modified forms without departing from the gist and the scope of the invention which are defined by the appended claims. Accordingly, description in this specification is for exemplary explanation, and does not have any restrictive meaning for embodiments.

Any reference to elements having terms such as "first" and "second" in their names which are used in this specification does not generally limit the amounts or order of the elements. Such term's can be conveniently used to distinguish two or more elements in this specification. Accordingly, reference to first and second elements does not mean that only two elements are employed or that the first element has to precede the second element in any form.

When the terms "include," "comprising," and modifications thereof are used in this specification or the appended claims, the terms are intended to have a comprehensive meaning similar to the term "comprising." The term "of" which is used in this specification or the claims is not intended to mean an exclusive logical sum.

In this specification, a singular term includes plural referents unless it is obvious from the context or technically that there is only one.

In the entire disclosure, there can be two or more of any element unless it is apparent from the context that the element is singular.

REFERENCE SIGNS LIST 1, 1C, 1D, 1E . . . Blur compensation system
1A, 1B . . . Image presentation system
10, 20, 21, 22, 90 . . . Mirror
15 . . . Half mirror
30 . . . Lens
35 . . . Screen
40 . . . Display
45 . . . Projector
50 . . . Camera
60 . . . Microphone
70 . . . Speaker
80 . . . Control device

The invention claimed is:

1. A blur compensation system comprising:
a first optical element on which light of an image from a predetermined position is incident and which reflects or transmits light of a specific wavelength such that a magnitude or value of an incidence angle and an emission angle of the light of the specific wavelength are different from each other;
a second optical element that is disposed at a position on which the light of an image which is reflected or transmitted by the first optical element is incident and reflects or transmits the light of the specific wavelength such that a magnitude or value of an incidence angle and an emission angle of the light of the specific wavelength are different from each other; and
a third optical element that is disposed on an optical axis of the light of an image between the first optical element and the second optical element and changes a direction of the light of an image which is reflected or transmitted by the first optical element such that light of a wavelength other than the specific wavelength out of the light of an image which is reflected or transmitted by the first optical element is emitted in the same direction as the light of the specific wavelength from an emission position of the light of the specific wavelength in the second optical element,
wherein each of the first optical element and the second optical element is a diffractive optical element or a holographic optical element.

2. The blur compensation system according to claim 1, wherein the first optical element and the second optical element have optical characteristics with which a relationship between an incidence angle and an emission angle of the light of the specific wavelength in the first optical element and a relationship between an incidence angle and an emission angle of the light of the specific wavelength in the second optical element are substantially the same as each other, and wherein the third optical element changes the direction of the light of an image which is reflected or transmitted by the first optical element such that a difference between an incidence angle of the light of the specific wavelength and an incidence angle of light of a wavelength other than the specific wavelength at an incidence position in the second optical element of the light of the specific wavelength out of the light of an image which is reflected or transmitted by the first optical element is equal to a difference between an emission angle of the light of the specific wavelength and an emission angle of light of a wavelength other than the specific wavelength at an emission position in the first optical element of the light of the specific wavelength.

3. The blur compensation system according to claim 1, wherein light of an image which is displayed by a display which is disposed at the predetermined position is incident on the first optical element, and wherein the third optical element is a condensing lens.

4. The blur compensation system according to claim 1, wherein light of an image which is output from a projector which is disposed at the predetermined position is incident on the first optical element, and wherein the third optical element is a diffusing screen.

5. The blur compensation system according to claim 1, wherein the first optical element is a mirror that reflects the light of the specific wavelength such that an incidence angle and a reflection angle of the light of the specific wavelength are different from each other, and wherein the second optical element is a mirror that has substantially the same optical characteristics as the mirror.

6. The blur compensation system according to claim 2, wherein light of an image which is displayed by a display which is disposed at the predetermined position is incident on the first optical element, and wherein the third optical element is a condensing lens.

7. The blur compensation system according to claim 2, wherein light of an image which is output from a projector which is disposed at the predetermined position is incident on the first optical element, and wherein the third optical element is a diffusing screen.

8. The blur compensation system according to claim 2, wherein the first optical element is a mirror that reflects the light of the specific wavelength such that an incidence angle and a reflection angle of the light of the specific wavelength are different from each other, and wherein the second optical element is a mirror that has substantially the same optical characteristics as the mirror.

9. The blur compensation system according to claim 3, wherein the first optical element is a mirror that reflects the light of the specific wavelength such that an incidence angle and a reflection angle of the light of the specific wavelength are different from each other, and wherein the second optical element is a mirror that has substantially the same optical characteristics as the mirror.

10. The blur compensation system according to claim 4, wherein the first optical element is a mirror that reflects the light of the specific wavelength such that an incidence angle and a reflection angle of the light of the specific wavelength are different from each other, and wherein the second optical element is a mirror that has substantially the same optical characteristics as the mirror.

* * * * *